(12) United States Patent
Nakamura et al.

(10) Patent No.: US 8,652,693 B2
(45) Date of Patent: Feb. 18, 2014

(54) REFORMER, CELL STACK DEVICE, FUEL CELL MODULE, AND FUEL CELL DEVICE

(75) Inventors: Mitsuhiro Nakamura, Kirishima (JP); Takashi Ono, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 157 days.

(21) Appl. No.: 12/934,258

(22) PCT Filed: Mar. 24, 2009

(86) PCT No.: PCT/JP2009/055869
§ 371 (c)(1),
(2), (4) Date: Dec. 13, 2010

(87) PCT Pub. No.: WO2009/119616
PCT Pub. Date: Oct. 1, 2009

(65) Prior Publication Data
US 2011/0123881 A1    May 26, 2011

(30) Foreign Application Priority Data

| Mar. 26, 2008 | (JP) | 2008-080825 |
| Mar. 26, 2008 | (JP) | 2008-080830 |
| Aug. 28, 2008 | (JP) | 2008-219253 |
| Aug. 28, 2008 | (JP) | 2008-219254 |

(51) Int. Cl.
*H01M 8/06* (2006.01)

(52) U.S. Cl.
USPC ........... 429/408; 429/416; 429/423; 429/424; 429/425; 429/466

(58) Field of Classification Search
USPC .......... 429/408, 416, 423–425, 466, 502, 506
See application file for complete search history.

(56) References Cited

U.S. PATENT DOCUMENTS

| 5,725,964 | A * | 3/1998 | Huppmann | 429/423 |
| 6,613,470 | B1 * | 9/2003 | Sugita et al. | 429/416 |
| 2005/0087437 | A1 * | 4/2005 | Sakurai et al. | 204/172 |
| 2008/0110427 | A1 * | 5/2008 | Ricci-Ottati et al. | 123/1 A |
| 2009/0029201 | A1 * | 1/2009 | Morita et al. | 429/13 |
| 2009/0084524 | A1 * | 4/2009 | Miyazaki | 165/104.21 |
| 2010/0167154 | A1 | 7/2010 | Ono | |

FOREIGN PATENT DOCUMENTS

| DE | 10 2005 026783 A1 | 12/2006 |
| DE | 10 2005 040052 A1 | 12/2006 |
| EP | 1909349 A1 | 4/2008 |
| JP | 2002-029705 A | 1/2002 |
| JP | 2007-059377 A | 3/2007 |
| JP | 2008-013393 A | 1/2008 |
| WO | 2007/013328 A1 | 2/2007 |

OTHER PUBLICATIONS

International Search Report dated Jun. 30, 2009 issued by the Japanese Patent Office for International Patent Application No. PCT/JP2009/055869.
Supplementary European Search Report dated Jul. 12, 2012 issued by the European Patent Office for European Application No. EP 09 72 6175.
Search Opinion issued by European Patent Office for European Application No. EP 09 726 175.4.

* cited by examiner

*Primary Examiner* — Patrick Ryan
*Assistant Examiner* — Ben Lewis
(74) *Attorney, Agent, or Firm* — Procopio, Cory, Hargreaves & Savitch LLP

(57) ABSTRACT

A reformer including a vaporization part provided with a supply port through which raw fuel is supplied, the supply port being provided at a central section of a tubular container; and reforming parts provided at both sides of the container, each reforming part containing reforming catalyst that reforms the raw fuel that flows into the reforming part from the vaporization part into fuel gas and provided with a fuel-gas supply port through which the fuel gas is discharged.

6 Claims, 24 Drawing Sheets

REFORMER, CELL STACK DEVICE, FUEL CELL MODULE, AND FUEL CELL DEVICE

TECHNICAL FIELD

The present invention relates to a reformer for generating fuel gas to be supplied to fuel cells, and also relates to a cell stack device, a fuel cell module, and a fuel cell device including the reformer.

BACKGROUND ART

Various types of fuel cell modules including fuel cells accommodated in storage containers have been proposed as a next-generation power source (see, for example, Japanese Unexamined Patent Application Publication No. 2007-59377). The fuel cells generate electric power using fuel gas (hydrogen-containing gas) and air (oxygen-containing gas).

The hydrogen-containing gas to be supplied to the fuel cells is generated by, for example, a steam reforming method in which hydrogen is generated by a reaction between hydrocarbon, such as natural gas, and steam. Various reformers for carrying out such a steam reforming method have also been proposed.

FIG. 24 is a perspective view of a fuel cell module 130 according to a related art typified by the fuel cell module according to Japanese Unexamined Patent Application Publication No. 2007-59377. The fuel cell module 130 includes a storage container 131 and a cell stack device 138 accommodated in the storage container 131. The cell stack device 138 includes a cell stack 134 in which a plurality of fuel cells 132 are arranged; a manifold 133; a U-shaped reformer 135 disposed in an upper section of the cell stack 134; a raw-fuel supply pipe 137 connected to one end of the reformer 135; and a fuel-gas supply pipe 136 that connects the other end of the reformer 135 to one end of the manifold 133.

Raw fuel is supplied through the raw-fuel supply pipe 137, and is reformed into fuel gas (hydrogen-containing gas) in the reformer 135 by a reforming reaction, such as steam reforming. The fuel gas generated in the reformer 135 is supplied to the manifold 133 through the fuel-gas supply pipe 136 and is supplied to each of the fuel cells 132 through the manifold 133.

In the fuel cell module 130 illustrated in FIG. 24, the fuel gas generated in the reformer 135 is supplied to the manifold 133 through the fuel-gas supply pipe 136 that is connected to one end of the manifold 133. Therefore, the fuel gas cannot be sufficiently supplied to the fuel cells 132 that are distant from the fuel-gas supply pipe 136. As a result, there is a possibility that the fuel cells 132 will be degraded or the power generation efficiency of the cell stack 134 will be reduced.

DISCLOSURE OF INVENTION

Accordingly, the present invention provides a reformer capable of efficiently supplying fuel gas to each fuel cell included in a cell stack, and also provides a cell stack device, a fuel cell module, and a fuel cell device including the reformer.

A reformer according to the present invention includes a vaporization part provided with a supply port through which raw fuel is supplied, the supply port being provided at a central section of a tubular container; and reforming parts provided at both sides of the container, each reforming part containing reforming catalyst that reforms the raw fuel that flows into the reforming part from the vaporization part into fuel gas and provided with a fuel-gas supply port through which the fuel gas is discharged.

A cell stack device according to the present invention includes a cell stack including a plurality of column-shaped fuel cells arranged in an upright position and electrically connected to each other, the fuel cells including gas passages provided therein; a manifold to which bottom ends of the fuel cells are fixed and which is configured to supply fuel gas to the fuel cells; the above-described reformer, the reformer being disposed above the cell stack; and fuel-gas supply pipes provided at both ends of the manifold, the fuel-gas supply pipes being connected to the respective fuel-gas supply ports.

A fuel cell module according to the present invention includes a storage container; and the above-described cell stack device, the cell stack device being accommodated in the storage container. The reformer is provided on an inner surface of a top wall of the storage container.

A fuel cell device according to the present invention includes an external casing; the above-described fuel cell module, the fuel cell module being accommodated in the external casing; and an auxiliary device for driving the fuel cell module.

BRIEF DESCRIPTION OF DRAWINGS

Objects, features, and advantages of the present invention will become more apparent from the following detailed description and drawings.

BEST MODES FOR CARRYING OUT THE INVENTION

Preferred embodiments of the present invention will now be described in detail with reference to the drawings.
(First Embodiment)

Figure 1:
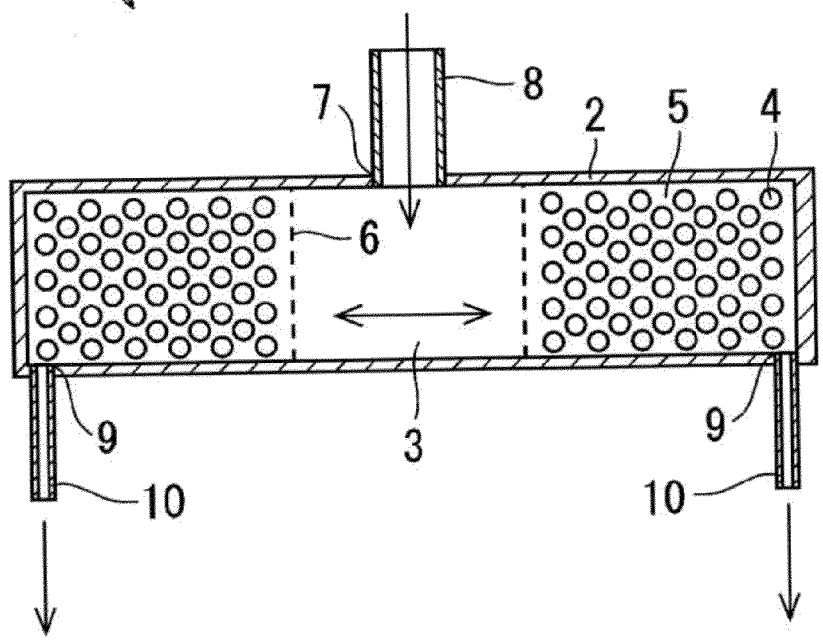
FIG. 1 is a sectional view of a reformer according to a first embodiment of the present invention.

FIG. 1 is a sectional view of a reformer 1 according to a first embodiment of the present invention. In the following figures, components that are the same as each other are denoted by the same reference numerals.

The reformer 1 illustrated in FIG. 1 includes a vaporization part 3 at the center of a tubular container 2 and reforming parts 5, in which reforming catalyst 4 is contained, at both sides of the container 2 (that is, at both sides of the vaporization part 3). The vaporization part 3 has a supply port 7 through which raw fuel is supplied, and a raw-fuel supply pipe 8 is connected to the supply port 7. Each of the reforming parts 5 has a fuel-gas supply port 9 through which the fuel gas generated by reforming the raw fuel is discharged, and a fuel-gas supply pipe 10 is connected to the fuel-gas supply port 9. The vaporization part 3 is separated from the reforming parts 5 by walls 6 comprising gas permeability.

The raw fuel (for example, natural gas, which is hydrocarbon gas, or kerosene) is supplied through the raw-fuel supply pipe 8 and is vaporized as necessary in the vaporization part 3. Then, the raw fuel flows into the reforming parts 5 at both sides of the container 2 (at both sides of the vaporization part 3), so that the raw fuel is reformed by the reforming catalyst 4 in the reforming parts 5 and the fuel gas is generated. Since two reforming parts 5 are provided in a single reformer 1, the reformer 1 is capable of carrying out the reforming reaction with high efficiency.

The reforming catalyst 4 contained in the reforming parts 5 preferably have a high reforming efficiency and a high durability. For example, reforming catalysts in which noble metals, such as Ru and Pt, or base metals, such as Ni and Fe, are carried by porous carriers, such as γ-alumina, α-alumina, and cordierite, may be used as the reforming catalyst 4. Here, commonly known reforming catalysts may be used as the reforming catalyst 4 in accordance with the reforming reaction to be carried out in the reforming parts 5.

The fuel gas generated by the reforming reaction in the reforming parts 5 is discharged through the fuel-gas supply ports 9 formed in the reforming parts 5 (the fuel gas is supplied through the fuel-gas supply pipes 10 connected to the fuel-gas supply ports 9). Therefore, the amounts of fuel gas generated by the reforming reaction in the reforming parts 5 are preferably equal to each other.

Therefore, in the reformer 1 illustrated in FIG. 1, the distances from the supply port 7 in the vaporization part 3 to the fuel-gas supply ports 9 are equal to each other. In addition, the reforming parts 5 each contain the same amount of reforming catalyst 4 composed of the same material. In other words, in the reformer 1 illustrated in FIG. 1, the distances from the supply port 7 in the vaporization part 3 to the walls 6 are equal to each other, and the reforming parts 5 have the same size and contain the same amount of reforming catalyst 4 composed of the same material. In addition, the distances from the supply port 7 in the vaporization part 3 to the fuel-gas supply ports 9 are equal to each other. Namely, the reformer 1 illustrated in FIG. 1 is symmetrical in the left-right direction about the center of the raw-fuel supply pipe 8 in the sectional view. Alternatively, the reformer 1 may be point-symmetrical about the center of the raw-fuel supply pipe 8 as long as the distances from the supply port 7 in the vaporization part 3 to the fuel-gas supply ports 9 are equal to each other.

Accordingly, the same amount of raw fuel that is supplied from the raw-fuel supply pipe 8 flows toward each of the reforming parts 5, and the same amount of fuel gas is generated by each of the reforming reactions in the reforming parts 5.
(Second Embodiment)

Figure 2:
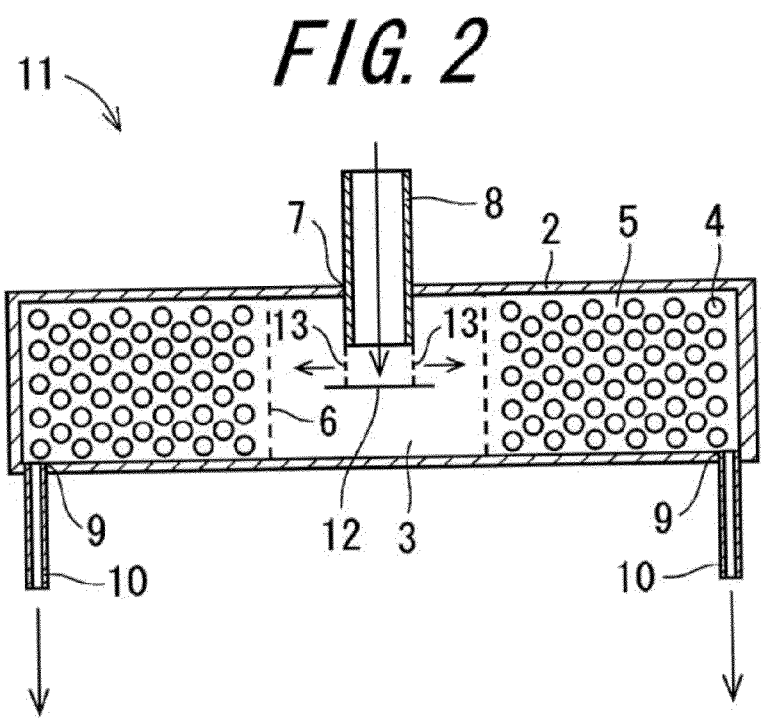
FIG. 2 is a sectional view of a reformer according to a second embodiment of the present invention.

FIG. 2 illustrates a reformer according to a second embodiment of the present invention. FIG. 2 is a sectional view of a reformer 11 in which the raw-fuel supply pipe 8 connected to the supply port 7 in the reformer 1 (in the vaporization part 3) illustrated in FIG. 1. The reformer 11 is provided with a raw-fuel-flowing-direction regulating member 12 for causing the raw fuel to flow toward each of the reforming parts 5.

To cause the raw fuel supplied from the raw-fuel supply pipe 8 to evenly flow toward each of the reforming parts 5, the raw-fuel supply pipe 8 is preferably provided with the member 12 for causing the raw fuel to flow toward each of the reforming parts 5.

Accordingly, the raw fuel supplied from the raw-fuel supply pipe 8 evenly flows toward each of the reforming parts 5, and the reforming reaction can be carried out with high efficiency in each of the reforming parts 5. In addition, the same amount of fuel gas can be generated in each of the reforming parts 5.

In addition, to efficiently supply the raw fuel from the raw-fuel supply pipe 8 to each of the reforming parts 5, the raw-fuel supply pipe 8 is preferably connected such as to project into the vaporization part 3.

The raw-fuel-flowing-direction regulating member 12 may be, for example, a tubular container which has a bottom portion and in which holes are formed at the left and right sides, as illustrated in FIG. 2. Alternatively, a pipe comprising two end portions that are branched from each other or other members that are capable of causing the air to flow in two directions toward the left and right may be used as the raw-fuel-flowing-direction regulating member 12.

In the case where the raw-fuel-flowing-direction regulating member 12 is provided as described above, outlets 13 are preferably formed in the raw-fuel-flowing-direction regulating member 12 such that the outlets 13 do not face the bottom surface of the vaporization part 3.

In the case where the outlets 13 are formed in the raw-fuel-flowing-direction regulating member 12 such that the raw fuel flows directly toward the bottom surface of the vaporization part 3, there is a possibility that the temperature of a part of the vaporization part 3 will suddenly decrease and the vaporization efficiency in the vaporization part 3 will be reduced. In particular, in the case where the reformer 11 is disposed above fuel cells, there is a possibility that the temperature of the fuel cells disposed below the vaporization part 3 will suddenly decrease and the power generation efficiency of the fuel cells will be reduced.

Therefore, the outlets 13 are formed in the raw-fuel-flowing-direction regulating member 12 such that the outlets 13 do not face the bottom surface of the vaporization part 3. Accordingly, reduction in the temperature of a part of the vaporization part 3 can be suppressed. In addition, in the case where the reformer 11 is disposed above the fuel cells, sudden reduction in the temperature of the fuel cells disposed below the vaporization part 3 can be suppressed.

It is not necessary to provide the raw-fuel-flowing-direction regulating member 12 on the raw-fuel supply pipe 8, and the raw-fuel-flowing-direction regulating member 12 may instead be arranged such as to hang from the top wall of the vaporization part 3.

(Third Embodiment)

Figure 3:
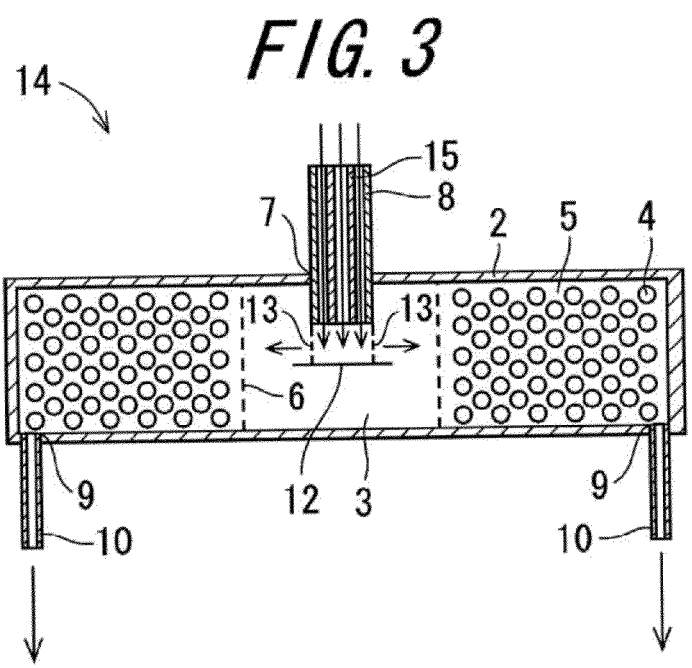
FIG. 3 is a sectional view of a reformer according to a third embodiment of the present invention.

FIG. 3 illustrates a reformer according to a third embodiment of the present invention. FIG. 3 is a sectional view of a reformer 14 in which a double pipe for supplying raw fuel and water is connected to the supply port 7 in the reformer 11 (in the vaporization part 3) illustrated in FIG. 2.

In the reformer 14 illustrated in FIG. 3, the raw-fuel supply pipe 8 for supplying the raw fuel is connected to the supply port 7 in the vaporization part 3, and a water supply pipe 15 for supplying water to the reformer 14 (to the vaporization part 3) is disposed inside the raw-fuel supply pipe 8. The raw-fuel supply pipe 8 and the water supply pipe 15 form the double pipe.

In the case where steam reforming is performed in the reformer 14 (reforming parts 5), it is necessary to supply water to the vaporization part 3, vaporize the water, and supply the steam to the reforming parts 5. Since the raw-fuel supply pipe 8 and the water supply pipe 15 are formed as the double pipe, water (steam) can be evenly supplied to each of the reforming parts 5. Therefore, in the case where steam reforming is performed in the reformer 14, the same amount of fuel gas can be generated in each of the reforming parts 5.

Although an example of a double pipe in which the water supply pipe 15 is disposed inside the raw-fuel supply pipe 8 is illustrated in FIG. 3, the raw-fuel supply pipe 8 may instead be disposed inside the water supply pipe 15. Alternatively, the raw-fuel supply pipe 8 and the water supply pipe 15 may be separately formed.

(Fourth Embodiment)

Figure 4:
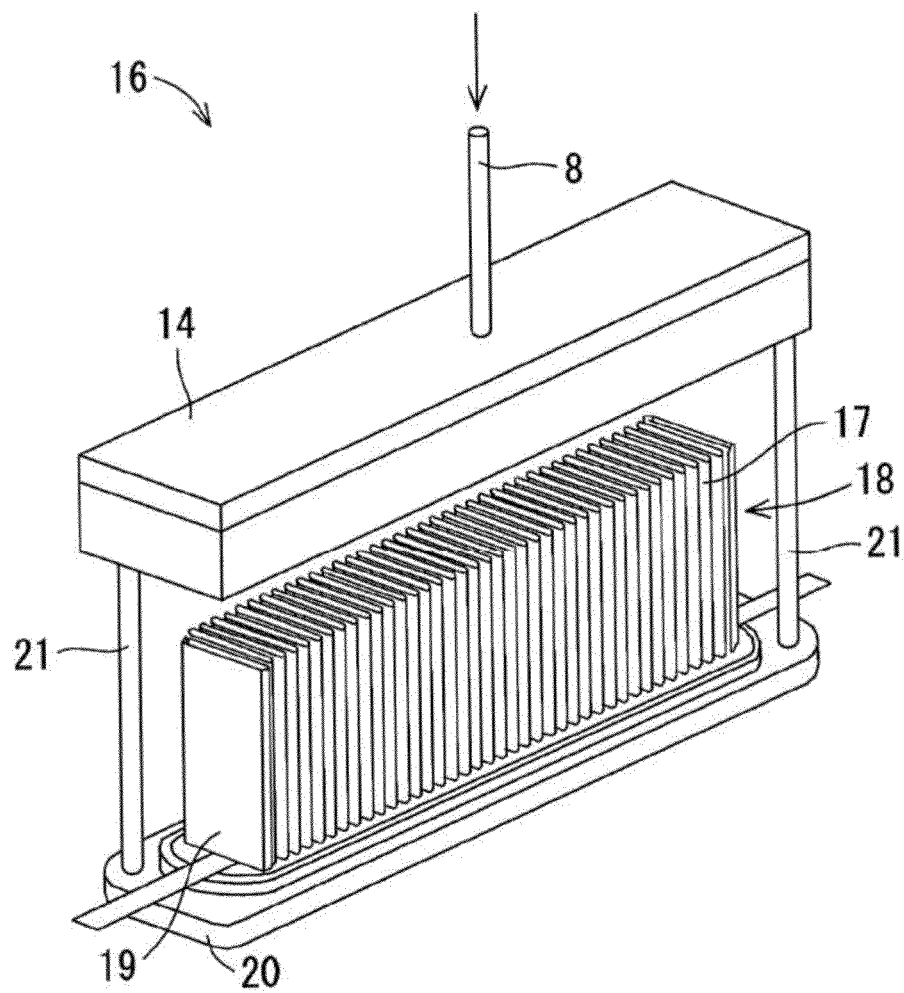
FIG. 4 is a perspective view of a cell stack device according to a fourth embodiment of the present invention.

FIG. 4 illustrates a cell stack device 16 according to a fourth embodiment. The cell stack device 16 includes a cell stack 18 in which a plurality of fuel cells 17 that have gas passages provided therein are arranged in an upright position such that the fuel cells 17 are electrically connected to each other with collectors (not shown) interposed therebetween. The bottom ends of the fuel cells 17 included in the cell stack 18 are fixed to a manifold 20, which supplies fuel gas to the fuel cells 17. The reformer 14 illustrated in FIG. 3 is arranged above the fuel cells 17 (the cell stack 18). Fuel-gas supply pipes 21 are provided at end portions of the manifold 20, and are connected to each of the fuel-gas supply ports 9 of the reformer 14. Here, "end portions" refer to the spaces between the ends of the cell stack 18 and the ends of the manifold 20 and side surfaces of the manifold 20 that are perpendicular to the direction in which the fuel cells 17 are arranged. Collectors 19 including current conductors for collecting currents generated by power generation in the fuel cells 17 and conducting the collected currents to the outside are disposed at both ends of the cell stack 18. In the cell stack device 16 illustrated in FIG. 4, the fuel-gas supply pipes 21 are on a diagonal line of the manifold 20.

In the cell stack device 16 comprising the above-described structure, the fuel gas generated in the reforming parts 5 of the reformer 14 is supplied through the respective fuel-gas supply pipes 21 to the manifold 20 at the both ends portions thereof.

Accordingly, sufficient amount of fuel gas can be supplied to the fuel cells 17 included in the cell stack 18 disposed on the manifold 20, and degradation of the fuel cells 17 or reduction in the power generation efficiency can be suppressed.

In addition, in the cell stack device 16 illustrated in FIG. 4, the reformer 14 and the manifold 20 are connected to each other by two fuel-gas supply pipes 21. Therefore, the reformer 14 and the manifold 20 can be strongly connected to each other.

The distances from the supply port 7 in the vaporization part 3 of the reformer 14 to the connecting portions between the manifold 20 and each of the fuel-gas supply pipes 21 are preferably equal to each other, so that the same amount of fuel gas can be supplied through the fuel-gas supply pipes 21 to the manifold 20.

Accordingly, sufficient amount of fuel gas can be supplied to the fuel cells 17 included in the cell stack 18 disposed on the manifold 20, and degradation of the fuel cells 17 and reduction in the power generation efficiency can be suppressed.

The cell stack device 16 may be structured such that excess fuel gas is burned at the top ends of the fuel cells 17, so that the temperature in the reformer 14 can be increased by the combustion heat generated in the case where the excess fuel gas is burned. Accordingly, the reforming reaction can be carried out by the reformer 14 with high efficiency.

Heat is generated in the fuel cells 17 (in the cell stack 18) in the case where the fuel cells 17 generate power. The heat generated by the power generation is dissipated through spaces between the fuel cells 17 that are adjacent to each other.

In the cell stack 18 in which the fuel cells 17 are arranged next to each other and electrically connected to each other in series, heat can be easily dissipated from the fuel cells 17 near the ends of the cell stack 18 in the direction in which the fuel cells 17 are arranged, whereas heat cannot be easily dissipated from the fuel cells 17 near the central section of the cell stack 18 in the direction in which the fuel cells 17 are arranged. Therefore, the temperature distribution over the entire body of the cell stack 18 may become uneven such that the temperature is high at the central section and low at the ends.

In addition, in the case where the excess fuel gas that is output from the fuel cells 17 is burned at the top ends of the fuel cells 17, the temperature distribution may become uneven such that the temperature at the top ends of the fuel cells 17 is high whereas the temperature at the bottom ends of the fuel cells 17 is low.

In the cell stack device 16 illustrated in FIG. 4, the reformer 14 that performs steam reforming is disposed above the cell stack 18. Therefore, the vaporization part 3 of the reformer 14 is positioned above the fuel cells 17 at the central section of the cell stack 18.

Accordingly, the temperature of the fuel cells 17 at the central section of the cell stack 18 (in particular, the temperature at the top ends of the fuel cells 17 in the central section of the cell stack 18) is reduced by the endothermic reaction that occurs during vaporization of water supplied to the vaporization part 3 through the water supply pipe 15.

Thus, the temperature in the central section of the cell stack 18 (in particular, the temperature at the top ends of the fuel cells 17 in the central section) can be reduced. Therefore, the temperature distribution along the direction in which the fuel cells 17 are arranged in the cell stack 18 can be made more even, and the temperature distribution along the vertical direction of the fuel cells 17 can also be made more even. Accordingly, the power generation efficiency of the cell stack 18 in the cell stack device 16 can be increased.

Each of the fuel cells 17 illustrated in FIG. 4 as an example is a solid oxide fuel cell 17 that has a hollow flat plate shape with a gas passage through which the fuel gas (hydrogen-containing gas) flows in the longitudinal direction and that is formed by stacking a fuel-side electrode layer, a solid electrolyte layer, and an oxygen-side electrode layer in that order on the surface of a support member.

In the case where the solid oxide fuel cells 17 are used as the fuel cells 17, the power generation temperature of the fuel cells 17 is about 600° C. to 1,000° C. and is extremely high. Accordingly, the temperature distribution along the direction in which the fuel cells 17 are arranged and the temperature distribution along the vertical direction of the fuel cells 17 tend to become uneven.

In the above-described cell stack device 16, the temperature in the central section of the cell stack 18 (in particular, the temperature at the top ends of the fuel cells 17 in the central section) can be reduced. Therefore, the temperature distribution along the direction in which the fuel cells 17 are arranged in the cell stack 18 and the temperature distribution along the vertical direction of the fuel cells 17 can be made more even. This is particularly advantageous in the case where the solid oxide fuel cells are used as the fuel cells 17.

Fuel cells having a cylindrical shape, a flat plate shape, etc., may also be used as the fuel cells 17. In addition, solid oxide fuel cells formed by stacking an oxygen-side electrode layer, a solid electrolyte layer, and a fuel-side electrode layer in that order on the surface of a support member may also be used.

(Fifth Embodiment)

Figure 5:
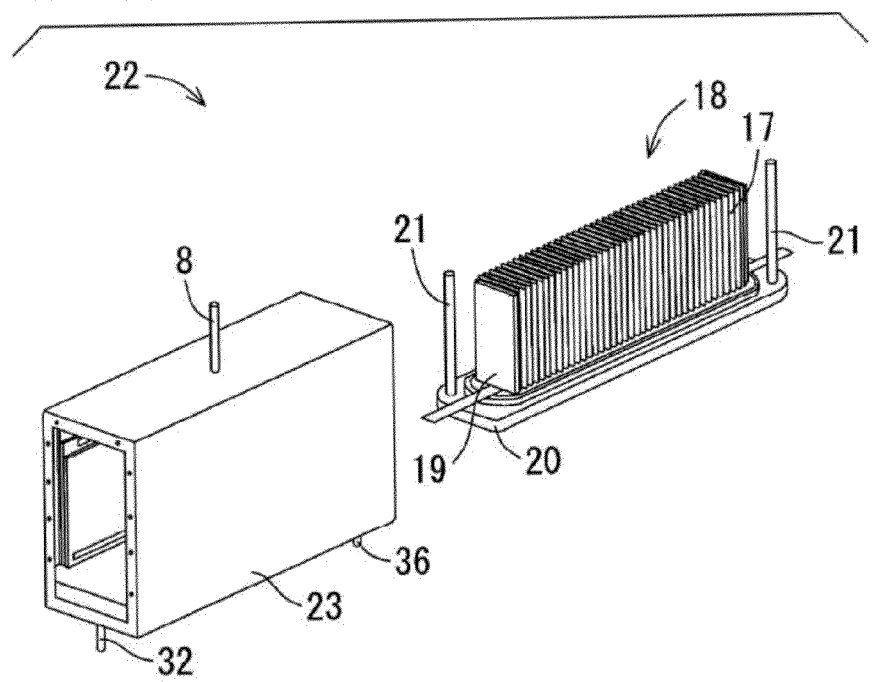
FIG. 5 is a perspective view of a fuel cell module according to a fifth embodiment of the present invention.

FIG. 5 is a perspective view of a fuel cell module 22 according to a fifth embodiment of the present invention. The fuel cell module 22 includes a storage container 23 and the above-described cell stack device 16 accommodated in the storage container 23. In the state illustrated in FIG. 5, the reformer 14 is provided on the inner side of the top wall of the storage container 23, and the reformer 14 is detached from the cell stack device 16.

The fuel cell module 22 illustrated in FIG. 5 is in the state in which parts (front and back sides) of the storage container 23 are removed and the cell stack device 16 (from which the reformer 14 is detached in FIG. 5) to be accommodated in the storage container 23 is pulled out of the storage container 23 from the back side thereof. The storage container 23 that accommodates the fuel cell module 22 will now be described.

Figure 6:
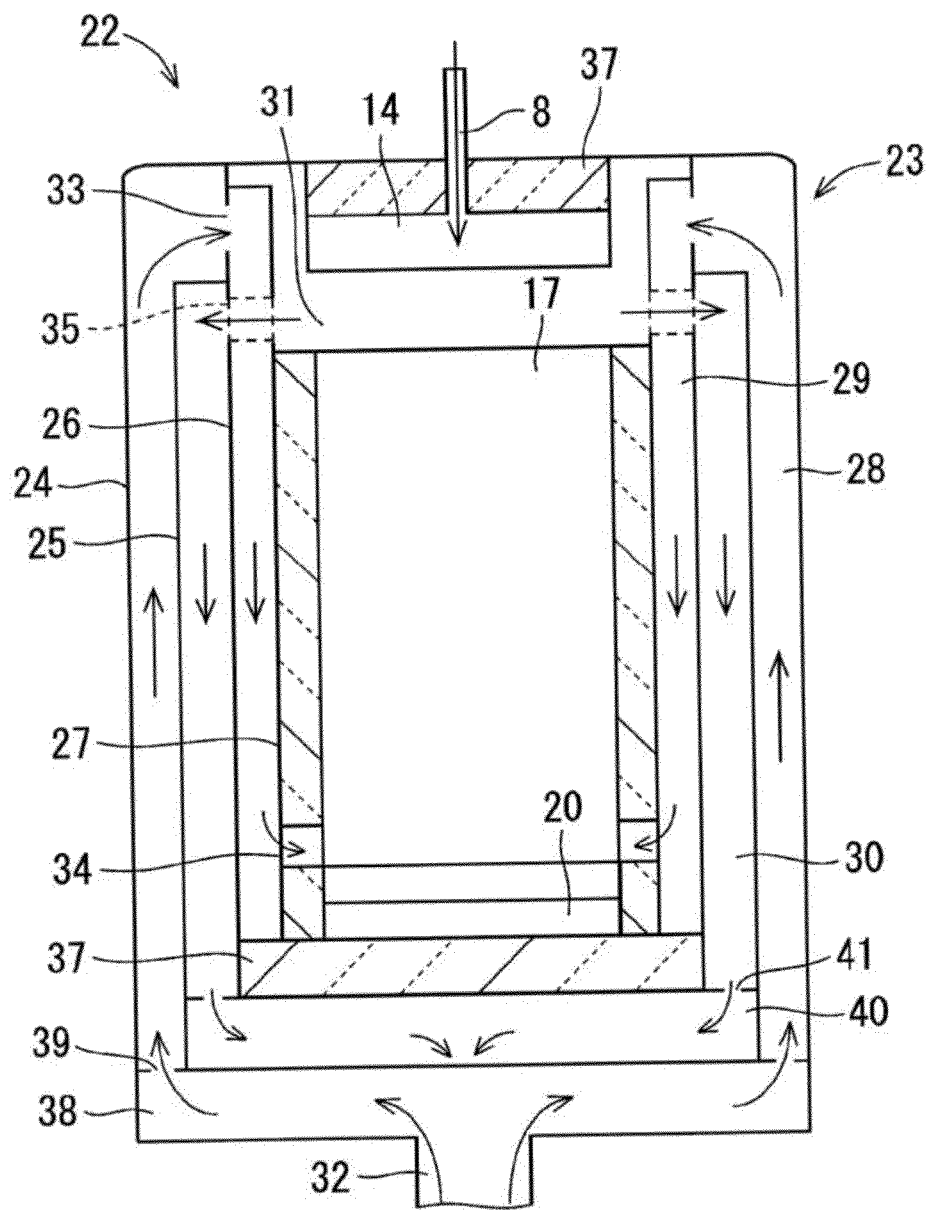
FIG. 6 is a sectional view of the fuel cell module according to the fifth embodiment of the present invention.
Figure 7:
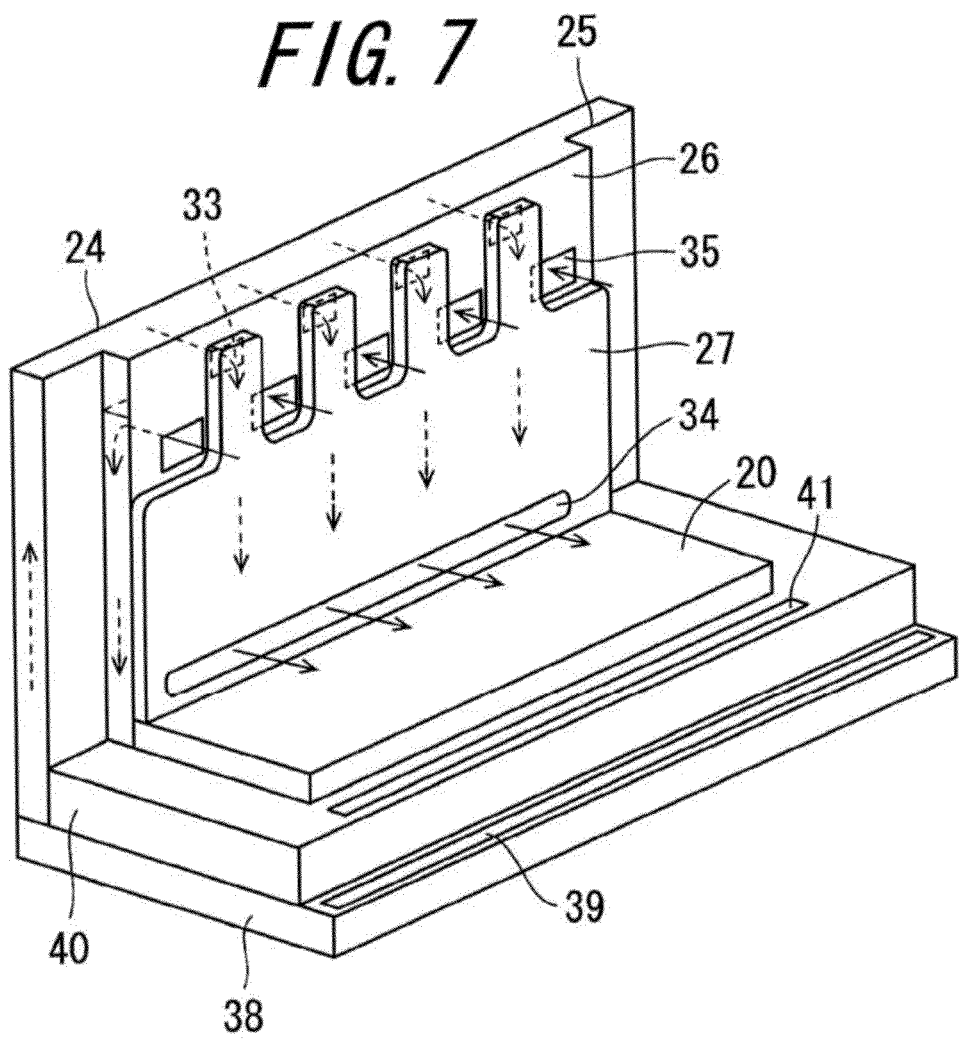
FIG. 7 is a perspective view of a side portion and a bottom portion of a storage container of the fuel cell module illustrated in FIG. 6.

FIG. 6 is a schematic sectional view of an example of the fuel cell module 22. FIG. 7 is a perspective view of a side portion and a bottom portion of the storage container 23 illustrated in FIG. 6.

The storage container 23 of the fuel cell module 22 includes outer walls 24 that form an outer frame of the storage container 23, and defines a generator chamber 31 that accommodates the fuel cells 17 (the cell stack 18) in the storage container 23.

In the storage container 23, flow paths through which air and exhaust gas flow are provided between side portions of the cell stack 18 that extend along the direction in which the fuel cells 17 are arranged and the outer walls 24 of the storage container 23 that are opposed to the side portions.

In the storage container 23, first walls 25 are disposed inside the outer walls 24 with predetermined intervals therebetween, and second walls 26 are disposed inside the first walls 25 with predetermined intervals therebetween. In addition, third walls 27 are disposed inside the second walls 26 with predetermined intervals therebetween.

The spaces between the outer walls 24 and the first walls 25 serve as first flow paths 28, the spaces between the second walls 26 and the third walls 27 serve as second flow paths 29, and the spaces between the first walls 25 and the second walls 26 serve as third flow paths 30.

In the storage container 23 illustrated in FIG. 6, the top ends of the first walls 25 are connected to the second walls 26, and the second walls 26 are connected to the top wall (outer wall 24) of the storage container 23. In addition, the top ends of the third walls 27 are connected to the second walls 26.

An air supply pipe 32 for supplying oxygen-containing gas (air) to the storage container 23 is connected to a bottom section of the storage container 23. The air supplied through the air supply pipe 32 flows into an air introduction section 38. The air introduction section 38 communicates with the first flow paths 28 through air inlets 39. Therefore, the air that flows through the air introduction section 38 flows into the first flow paths 28 through the air inlets 39. The air flows upward through the first flow paths 28 and flows into the second flow paths 29 through air vents 33 formed in the second walls 26. Then, the air flows downward through the second flow paths 29 and is supplied to the generator chamber 31 through air outlets 34 formed in the third wall 27.

Exhaust gas discharged from the fuel cells 17 and exhaust gas generated in the case where the excess fuel gas is burned at the top ends of the fuel cells 17 flow into the third flow paths 30 through exhaust gas vents 35 formed in the second walls 26. The exhaust gas flows downward through the third flow paths 30 and flows into an exhaust-gas collection section 40 through exhaust-gas collection vents 41. Then, the exhaust gas is discharged to the outside of the storage container 23 through an exhaust-gas discharge pipe 36 (see FIG. 5) connected to the exhaust-gas collection section 40.

Therefore, the air supplied through the air supply pipe 32 is subjected to heat exchange with the exhaust gas that flows through the exhaust-gas collection section 40 while the air flows through the air introduction section 38. Then, the air is subjected to heat exchange with the exhaust gas that flows through the third flow paths 30 while the air flows through the first flow paths 28. Then, the air is subjected to heat exchange with the exhaust gas that flows through the third flow paths 30 and the heat in the generator chamber 31 while the air flows through the second flow paths 29.

Therefore, the temperature of the air can be efficiently increased, and the power generation efficiency of the fuel cells 17 can be increased accordingly.

The fuel cell module 22 may be structured such that excess fuel gas is burned at the top ends of the fuel cells 17, so that the temperature in the reformer 14 can be increased by the combustion heat generated in the case where the excess fuel gas is burned. Accordingly, the reforming reaction can be carried out by the reformer 14 with high efficiency.

Referring to FIG. 7, a plurality of air vents 33 and a plurality of exhaust gas vents 35 are provided. Accordingly, the air that flows through the first flow paths 28 can efficiently flow into the second flow paths 29 and be supplied to the generator chamber 31. In addition, the exhaust gas in the generator chamber 31 can efficiently flow through the third flow paths 30 and be discharged to the outside of the storage container 23.

Heat insulators 37 (the heat insulators 37 are shown by oblique lines in the figure) are disposed at both sides of the cell stack 18 (fuel cells 17), and holes for allowing the air to flow toward the fuel cells 17 are formed in the heat insulators 37 at positions corresponding to the air outlets 34.

The air supplied to the generator chamber 31 through the air outlets 34 flows from the bottom ends to the top ends of the fuel cells 17 (a part of the air flows from the bottom ends to the top ends of the collectors disposed between the fuel cells 17). Therefore, the fuel cells 17 can perform power generation with high efficiency.

The heat insulators 37 are suitably arranged to prevent excessive heat dissipation from the storage container 23, which causes a temperature reduction in the fuel cells 17 (cell stack 18) and results in a reduction in the amount of power generation. In FIG. 6, the heat insulators 37 are provided at the bottom of the manifold 20, at both sides of the fuel cells 17 (cell stack 18), and between the top wall (outer wall 24) of the storage container 23 and the reformer 14. Thus, the reformer 14 is connected to the inner surface of the top wall (outer wall 24) of the storage container 23 with the heat insulator 37 interposed therebetween. This also applies to other embodiments which will be described below.

FIG. 6 illustrates an example in which the cell stack device 16 comprising a single cell stack 18 is disposed in the generator chamber 31. In this case, air is introduced along both sides of each fuel cell 17.

Referring to FIG. 6, the air supply pipe 32 and the exhaust-gas discharge pipe 36 are provided at separate positions. However, the exhaust-gas discharge pipe 36 may instead be positioned inside the air supply pipe 32.

Figure 8:
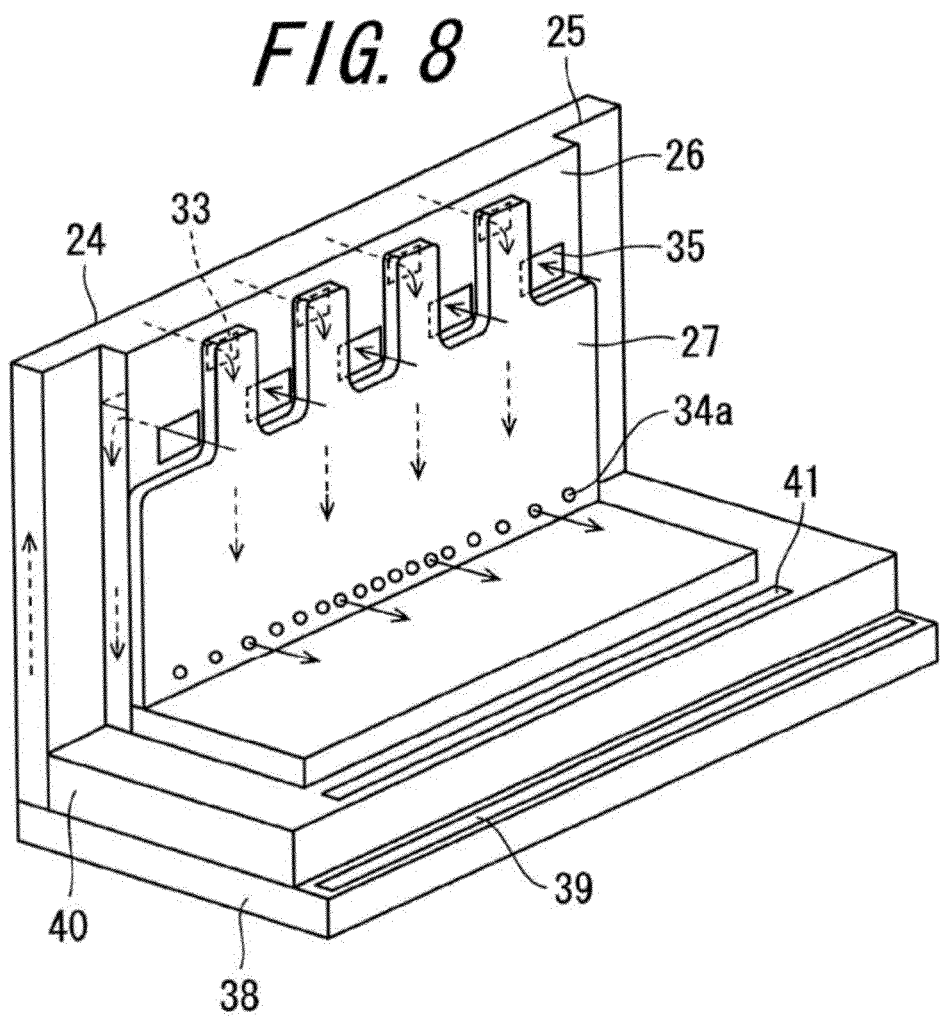
FIG. 8 is a perspective view of a side portion and a bottom portion of a storage container of an example of a fuel cell module other than that illustrated in FIG. 6.

FIG. 8 is a perspective view of a side portion and a bottom portion of the storage container 23 illustrated in FIG. 6, in which air outlets 34a according to another example are formed in each third wall 27.

Referring to FIG. 8, a plurality of air outlets 34a are provided to allow the air to flow into the cell stack 18. The air outlets 34a are arranged such that intervals between the air outlets 34a are narrow in the central section in the direction in which the fuel cells 17 are arranged and are wide in end sections in the direction in which the fuel cells 17 are arranged. Accordingly, a large amount of air is supplied to the cell stack 18 in the central section thereof, and the heat in the central section of the cell stack 18 in the direction in which the fuel cells 17 are arranged can be more efficiently dissipated compared to the heat in the end sections of the cell stack 18. Therefore, the temperature distribution along the direction in which the fuel cells 17 are arranged can be made more even.

The reformer 14 is disposed above the fuel cells 17 (cell stack 18), and is connected to the inner surface of the top wall (outer wall 24) of the storage container 23 with the heat insulator 37 interposed therebetween. Since the reformer 14 is disposed above the cell stack 18 (fuel cells 17), the temperature in the cell stack 18 at the central section thereof (in particular, the temperature at the top ends of the fuel cells 17 in the central section) can be reduced by the endothermic reaction that occurs during vaporization of water supplied to the vaporization part 3. Therefore, the temperature distribution along the direction in which the fuel cells 17 are arranged and the temperature distribution along the vertical direction of the fuel cells 17 can be made more even, and the power generation efficiency of the fuel cell module 22 can be increased accordingly.

In addition, since the heat insulator 37 is disposed between the reformer 14 and the top wall (outer wall 24) of the storage container 23, the temperature of the reformer 14 can be prevented from being reduced and the reformer 14 can carry out the reforming reaction with high efficiency.

The reformer 14 is connected to the manifold 20 with the fuel-gas supply pipes 21 that are connected to the respective fuel-gas supply ports 9, so that the fuel gas is supplied to the manifold 20 at both ends of the manifold 20. Therefore, a sufficient amount of fuel gas can be supplied to each of the fuel cells 17 from both ends of the manifold 20, and the air is supplied along both sides of each fuel cell 17. Accordingly, the power generation efficiency of the fuel cell module 22 can be increased.

Figure 9:
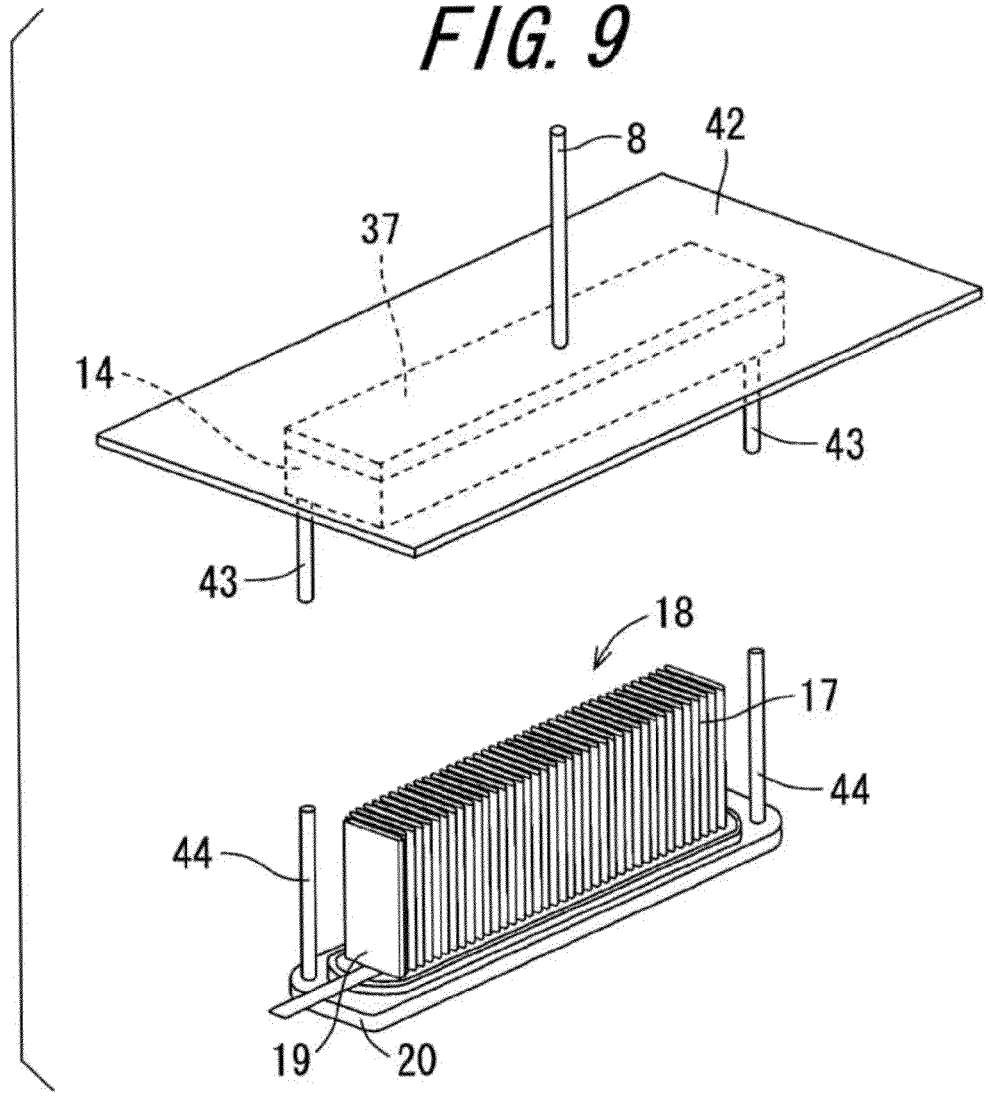
FIG. 9 is a perspective view of a top wall that is included in a storage container and connected to a reformer and a cell stack device that is separated from the reformer in the fuel cell module illustrated in FIG. 6.

FIG. 9 is a perspective view of the cell stack device 16 (from which the reformer 14 is detached) and the top wall 42 (outer wall 24), to which the reformer 14 is connected, of the storage container 23 included in the fuel cell module 22 illustrated in FIG. 6.

The fuel-gas supply pipes 21 through which the fuel gas generated in the reformer 14 is supplied to the manifold 20 include reformer-side fuel-gas supply pipes 43 that are connected to the reformer 14 (to the respective fuel-gas supply ports 9) and manifold-side fuel-gas supply pipes 44 that are connected to the manifold 20. The cell stack device 16 that is connected to the top wall 42 is formed by connecting the reformer-side fuel-gas supply pipes 43 to the manifold-side fuel-gas supply pipes 44.

Accordingly, since the reformer 14 is connected to the inner surface of the top wall 42, the reformer 14 and the cell stack device 16 from which the reformer 14 is detached can be easily positioned in the process of assembling the fuel cell module 22. Therefore, the fuel cell module 22 can be easily assembled.

In addition, in the above-described fuel cell module 22, the reformer 14 can be easily removed from the storage container 23 by disconnecting the reformer-side fuel-gas supply pipes 43 from the manifold-side fuel-gas supply pipes 44 and detaching the top wall 42 from the storage container 23. Therefore, the reformer 14 can be easily attached and detached.

Since the reformer 14 can be easily attached to and detached from the cell stack device 16, the fuel cell module 22 can be assembled as follows. That is, first, the cell stack device 16 from which the reformer 14 is detached is slid into the storage container 23. Then, the top wall 42 to which the reformer 14 is connected is attached to the storage container 23. Thus, the fuel cell module 22 can be easily assembled, and the cell stack device 16 can also be easily assembled.

In the case where the reformer-side fuel-gas supply pipes 43 are attached to the manifold-side fuel-gas supply pipes 44, the reformer-side fuel-gas supply pipes 43 are preferably positioned inside the manifold-side fuel-gas supply pipes 44 to reduce the possibility of leakage of the fuel gas supplied from the reformer 14.

The reformer-side fuel-gas supply pipes 43 and the manifold-side fuel-gas supply pipes 44 are preferably structured such that they can be easily attached to and detached from each other, for example, such that they can be attached to and detached from each other in a one-touch operation.

With the above-described structure, the reformer 14 can be easily disposed above the fuel cells 17. In the case where the excess fuel gas is burned at the top ends of the fuel cells 17, the temperature in the reformer 14 can be efficiently increased. As a result, the reforming efficiency of the reformer 14 can be increased.

(Sixth Embodiment)

Figure 10:
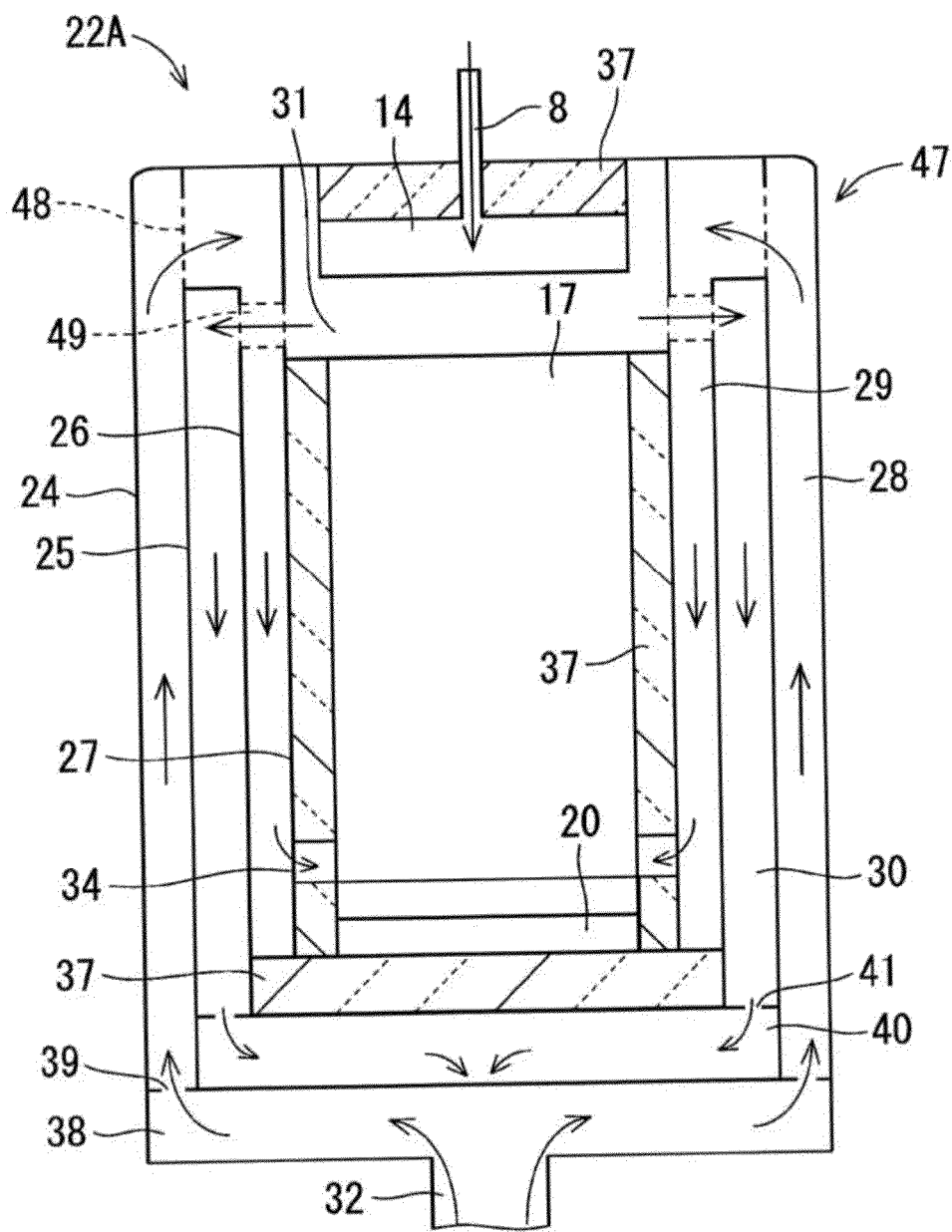
FIG. 10 is a schematic sectional view of a fuel cell module according to a sixth embodiment of the present invention.
Figure 11:
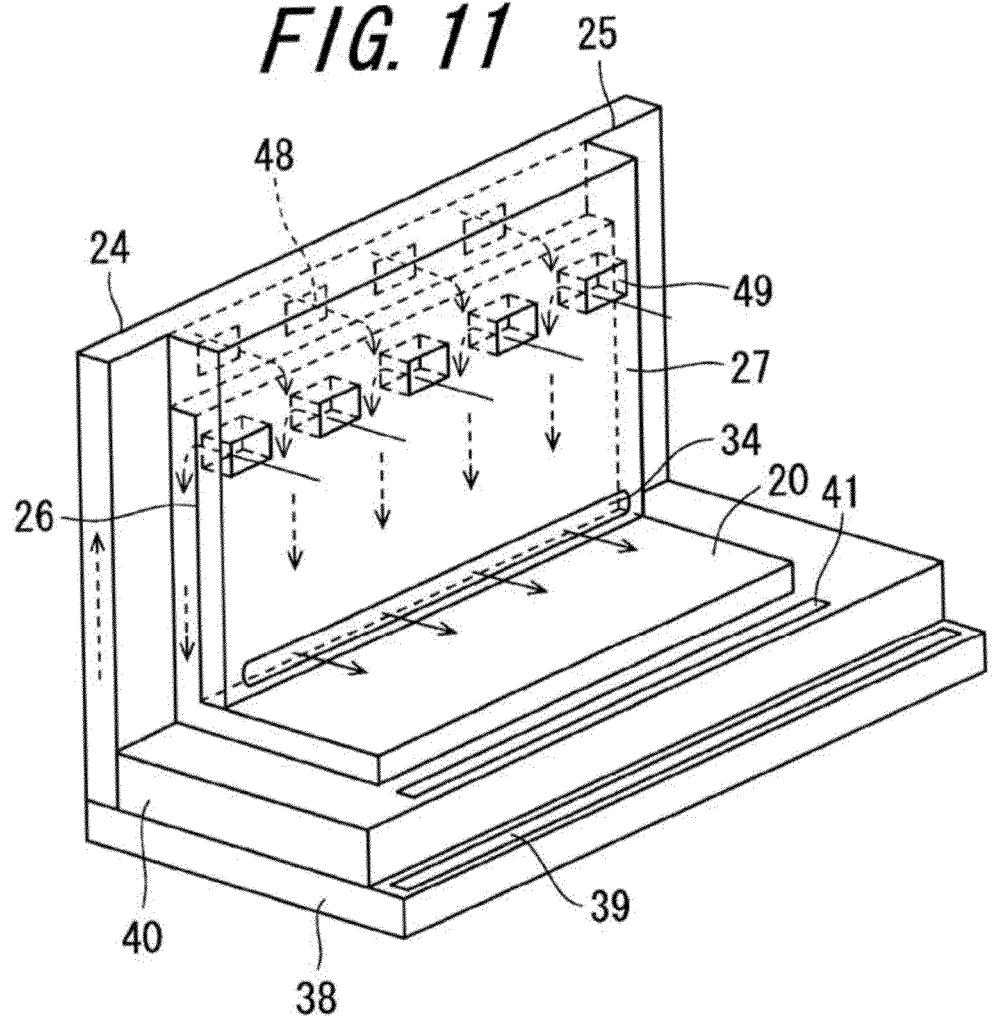
FIG. 11 is a perspective view of a side portion and a bottom portion of a storage container of the fuel cell module illustrated in FIG. 10.

FIG. 10 is a schematic sectional view of a fuel cell module 22A according to a sixth embodiment of the present invention. The fuel cell module 22A includes a storage container 47 and the cell stack device 16 accommodated in the storage container 47. FIG. 11 is a perspective view of a side portion and a bottom portion of the storage container 47 illustrated in FIG. 10.

In the storage container 47 illustrated in FIG. 10, the top ends of the first walls 25 are connected to the top wall (outer wall 24) of the storage container 47, and air vents 48 through which the first flow paths 28 communicate with the second flow paths 29 are formed in the first walls 25. In addition, the top ends of the second walls 26 are positioned below the air vents 48 in the first walls 25. The top ends of the third walls 27 are connected to the top wall (outer wall 24) of the storage container 47, and exhaust gas passages 49 that connect the generator chamber 31 to the third flow paths 30 are provided between the second walls 26 and the third walls 27. The third walls 27 may instead be connected to the first walls 25 at positions closer to the top wall of the storage container 47 than the connecting portions between the first walls 25 and the second walls 26 (at positions above the air vents 48).

In the storage container 47 comprising the above-described structure, the air flows into the first flow paths 28 from the air introduction section 38 and flows upward through the first flow paths 28. Then, the air flows into the second flow paths 29 through the air vents 48 formed in the first walls 25. Then, the air flows downward through the second flow paths 29 and is supplied to the generator chamber 31 through the air outlets 34 formed in the third wall 27.

Exhaust gas discharged from the fuel cells 17 and exhaust gas generated in the case where the excess fuel gas is burned at the top ends of the fuel cells 17 flow into the third flow paths 30 through the exhaust gas passages 49 provided between the second walls 26 and the third walls 27. The exhaust gas flows downward through the third flow paths 30 and flows into an exhaust-gas collection section 40 through exhaust-gas collection vents 41. Then, the exhaust gas is discharged to the outside of the storage container 47 through an exhaust-gas discharge pipe 36 connected to the exhaust-gas collection section 40.

Therefore, also in the storage container 47 comprising the above-described structure, the air supplied through the air supply pipe 32 is subjected to heat exchange with the exhaust gas that flows through the exhaust-gas collection section 40 while the air flows through the air introduction section 38. Then, the air is subjected to heat exchange with the exhaust gas that flows through the third flow paths 30 while the air flows through the first flow paths 28. Then, the air is subjected to heat exchange with the exhaust gas that flows through the third flow paths 30 and the heat in the generator chamber 31 while the air flows through the second flow paths 29.

Therefore, the temperature of the air can be efficiently increased, and the power generation efficiency of the fuel cells 17 can be increased accordingly.

Referring to FIG. 11, a plurality of air vents 48 and a plurality of exhaust gas passages 49 are provided. Accordingly, the air that flows through the first flow paths 28 can efficiently flow into the second flow paths 29 and be supplied to the generator chamber 31. In addition, the exhaust gas in the generator chamber 31 can efficiently flow through the third flow paths 30 and be discharged to the outside of the storage container 47.

In addition, in the case where the third walls 27 are connected to the top wall (outer wall 24) of the storage container 47, the exhaust gas in the generator chamber 31 can be prevented from remaining in the spaces near the reformer 14, and the exhaust gas in the generator chamber 31 efficiently flows into the third flow paths 30.

(Seventh Embodiment)

Figure 12:
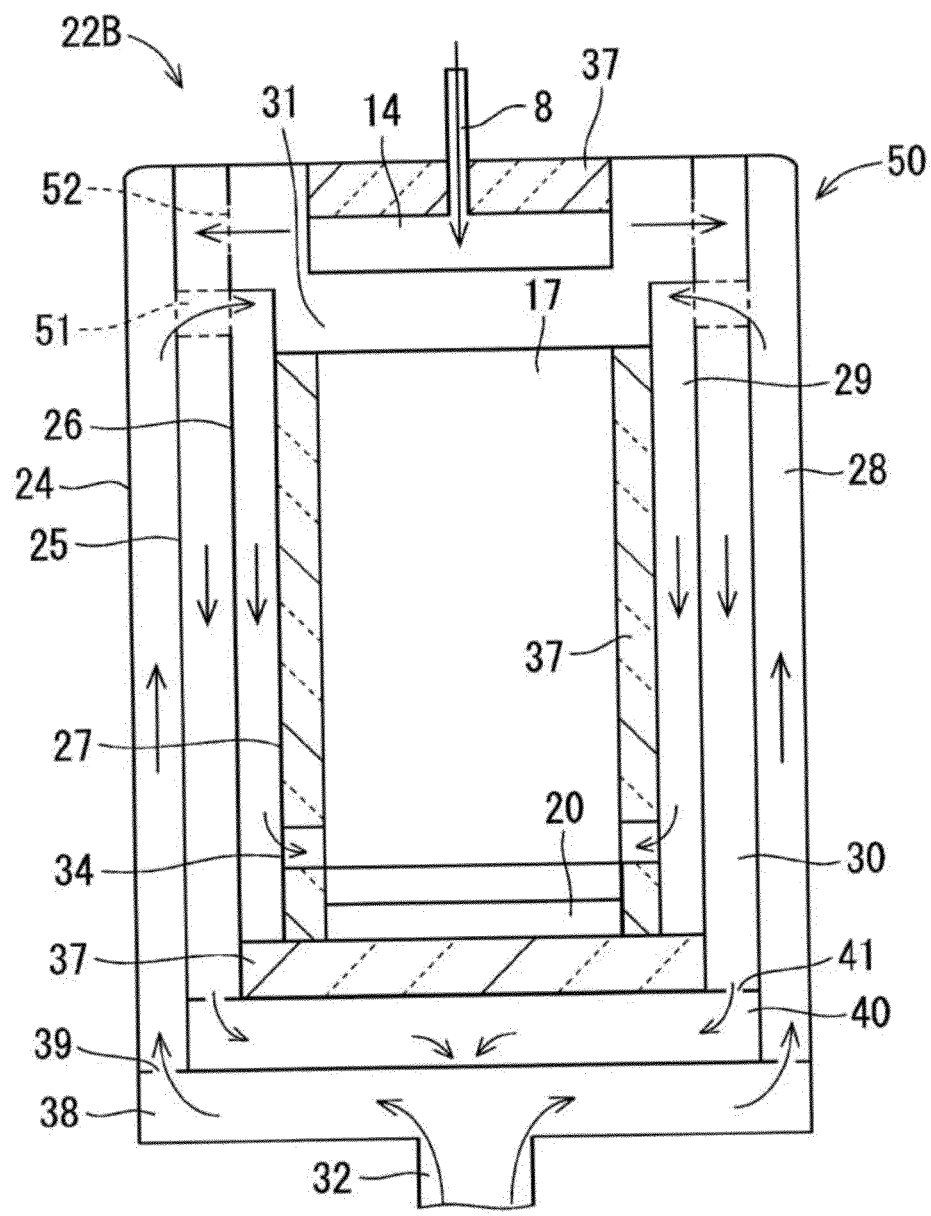
FIG. 12 is a schematic sectional view of a fuel cell module according to a seventh embodiment of the present invention.
Figure 13:
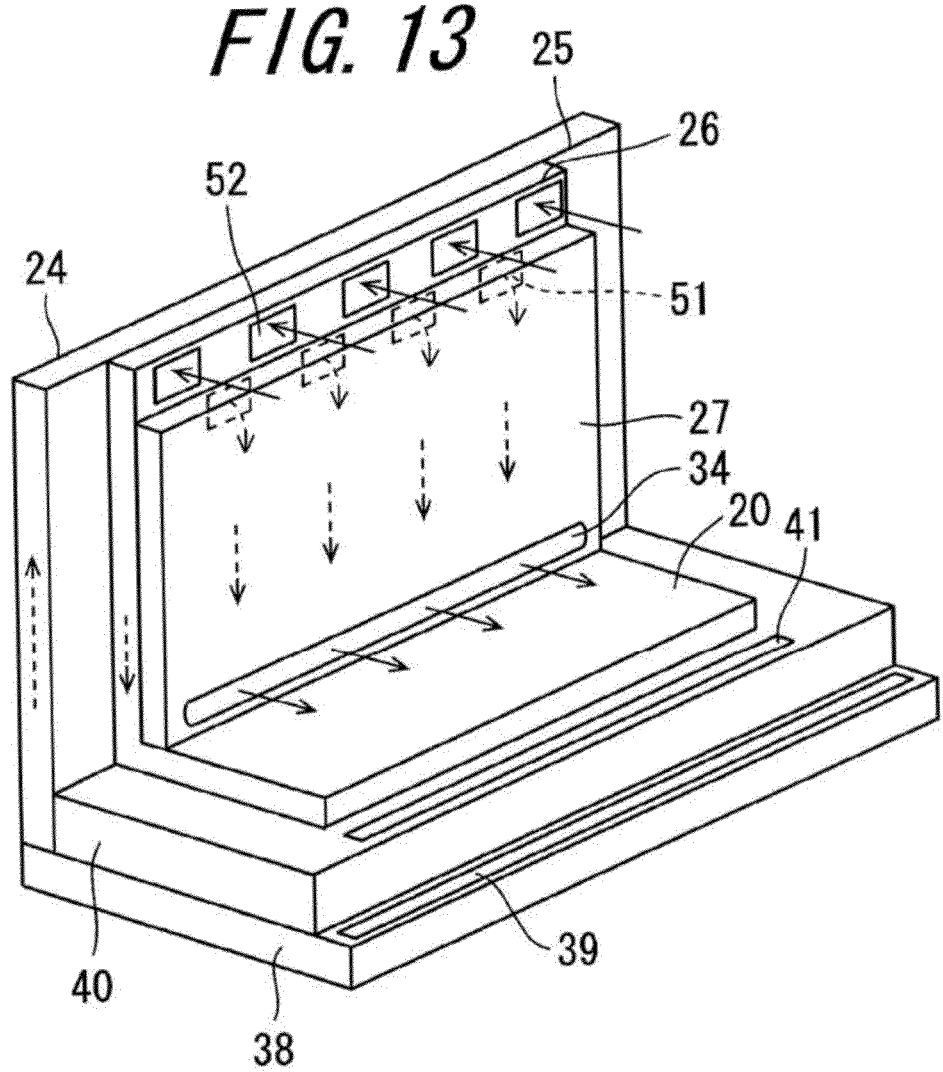
FIG. 13 is a perspective view of a side portion and a bottom portion of a storage container of the fuel cell module illustrated in FIG. 12.

FIG. 12 is a schematic sectional view of a fuel cell module 22B according to a seventh embodiment of the present invention. The fuel cell module 22B includes a storage container 50 and the cell stack device 16 accommodated in the storage container 50. FIG. 13 is a perspective view of a side portion and a bottom portion of the storage container 50 illustrated in FIG. 12.

In the storage container 50 illustrated in FIG. 12, the top ends of the first walls 25 are connected to the top wall (outer wall 24) of the storage container 50. In addition, the top ends of the second walls 26 are also connected to the top wall (outer wall 24) of the storage container 50. Exhaust gas vents 52 through which the generator chamber 31 communicates with the third flow paths 30 are formed in the second walls 26. Air passages 51 that connect the first flow paths 28 to the second flow paths 29 are provided between the first walls 25 and the second walls 26. The top ends of the third walls 27 are connected to the second walls 26 at positions below the exhaust gas vents 52 in the second walls 26 and above or at the same level as the top edges of the air passages 51. The top ends of the second walls 26 may be connected to the first walls 25 at positions closer to the top wall of the storage container 50 than the air passages 51.

In the storage container 50 comprising the above-described structure, the air flows into the first flow paths 28 from the air introduction section 38 and flows upward through the first flow paths 28. Then, the air flows into the second flow paths 29 through the air passages 51 provided between the first walls 25 and the second walls 26. Then, the air flows downward through the second flow paths 29 and is supplied to the generator chamber 31 through the air outlets 34 formed in the third wall 27.

Exhaust gas discharged from the fuel cells 17 and exhaust gas generated in the case where the excess fuel gas is burned at the top ends of the fuel cells 17 flow into the third flow paths 30 through exhaust gas vents 52 formed in the third walls 27. The exhaust gas flows downward through the third flow paths 30 and flows into an exhaust-gas collection section 40 through exhaust-gas collection vents 41. Then, the exhaust gas is discharged to the outside of the storage container 50 through an exhaust-gas discharge pipe 36 (see FIG. 5) connected to the exhaust-gas collection section 40.

Therefore, also in the storage container 50 comprising the above-described structure, the air supplied through the air supply pipe 32 is subjected to heat exchange with the exhaust gas that flows through the exhaust-gas collection section 40 while the air flows through the air introduction section 38. Then, the air is subjected to heat exchange with the exhaust gas that flows through the third flow paths 30 while the air flows through the first flow paths 28. Then, the air is subjected to heat exchange with the exhaust gas that flows through the third flow paths 30 and the heat in the generator chamber 31 while the air flows through the second flow paths 29.

Therefore, the temperature of the air can be efficiently increased, and the power generation efficiency of the fuel cells 17 can be increased accordingly.

Referring to FIG. 13, a plurality of air passages 51 and a plurality of exhaust gas vents 52 are provided as an example. Accordingly, the air that flows through the first flow paths 28 can efficiently flow into the second flow paths 29 and be supplied to the generator chamber 31. In addition, the exhaust gas in the generator chamber 31 can efficiently flow through the third flow paths 30 and be discharged to the outside of the storage container 50.

The temperature in an upper section of the generator chamber 31 is increased by the heat generated in the case where the power is generated by the fuel cells 17 and the heat generated in the case where the excess fuel gas is burned at the top ends of the fuel cells 17. Since the exhaust gas vents 52 formed in the third walls 27 are positioned in the upper section of the generator chamber 31, the exhaust gas at a high temperature efficiently flows into the third flow paths 30.

Therefore, the heat exchange between the exhaust gas that flows through the third flow paths 30 and the air can be efficiently performed and the temperature of the air can be efficiently increased. As a result, the power generation efficiency of the fuel cells 17 can be increased.

Figure 14:
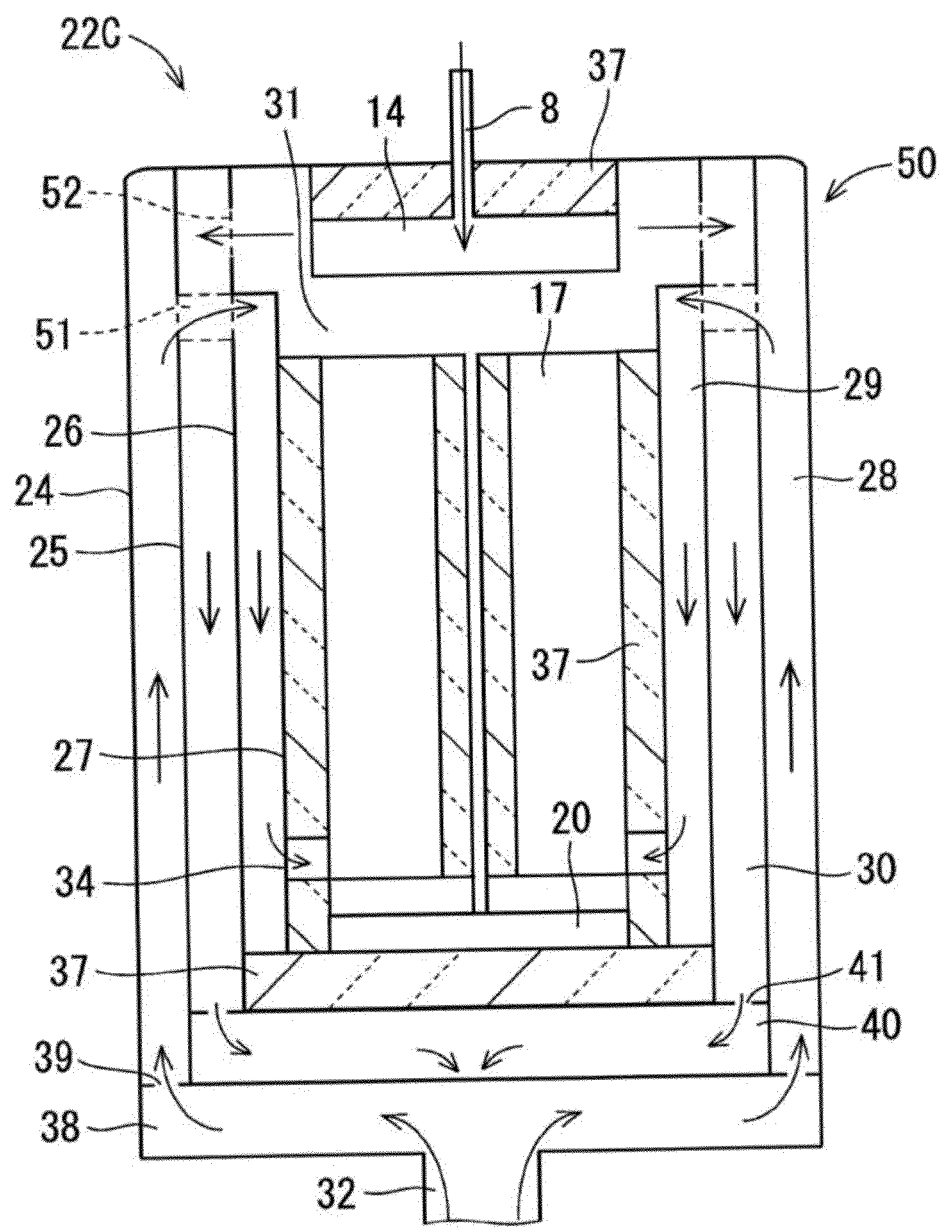
FIG. 14 is a schematic sectional view of an example of a fuel cell module other than that illustrated in FIG. 12.

FIG. 14 is a sectional view illustrating a fuel cell module 22C as an example in which two cell stacks 18 are arranged next to each other in the generator chamber 31 of the storage container 50 illustrated in FIG. 13. The two cell stacks 18 are arranged on a single manifold 20.

In this case, the air is supplied to each cell stack 18 through the air outlet 34 at one side of the cell stack 18. Therefore, even if the two cell stacks are arranged next to each other, the fuel cells 17 can perform power generation with high efficiency.

To allow the air supplied through the air outlets 34 to efficiently flow between the fuel cells 17 included in the cell stacks 18 from the bottom ends to the top ends of the fuel cells 17, a heat insulator (board-shaped or flocculate heat insulator) may be arranged between the cell stacks 18. Accordingly, the air supplied through one side of each cell stack 18 (through the air-outlet-34 side) is prevented from flowing out of each cell stack 18 through the other side thereof. In this case, even if the air supplied from the air outlet 34 at one side of each cell stack 18 flows toward the other side of the cell stack 18, the air is caused to flow upward along the heat insulator. Therefore, the air efficiently flows between the fuel cells 17.

(Eighth Embodiment)

Figure 15:
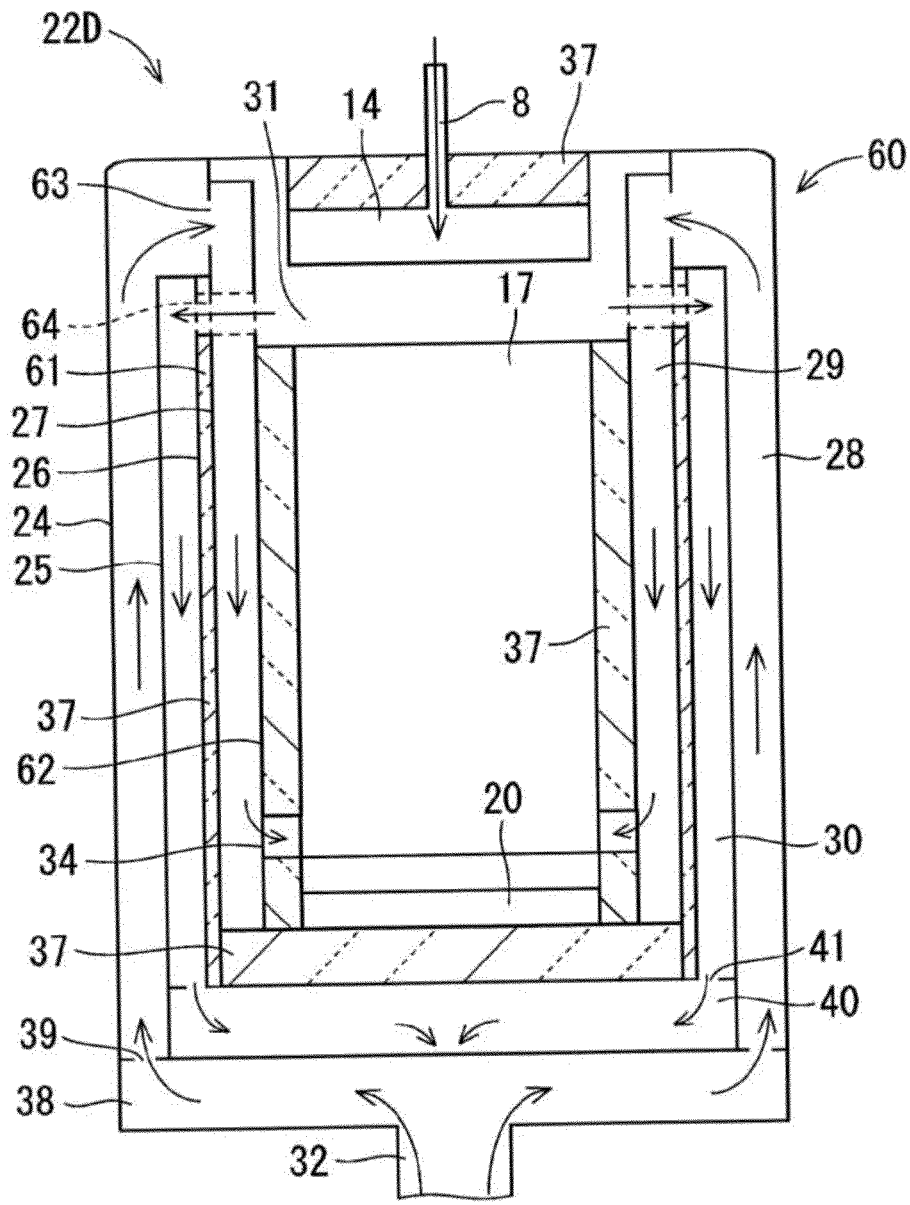
FIG. 15 is a schematic sectional view of a fuel cell module according to an eighth embodiment of the present invention.
Figure 16:
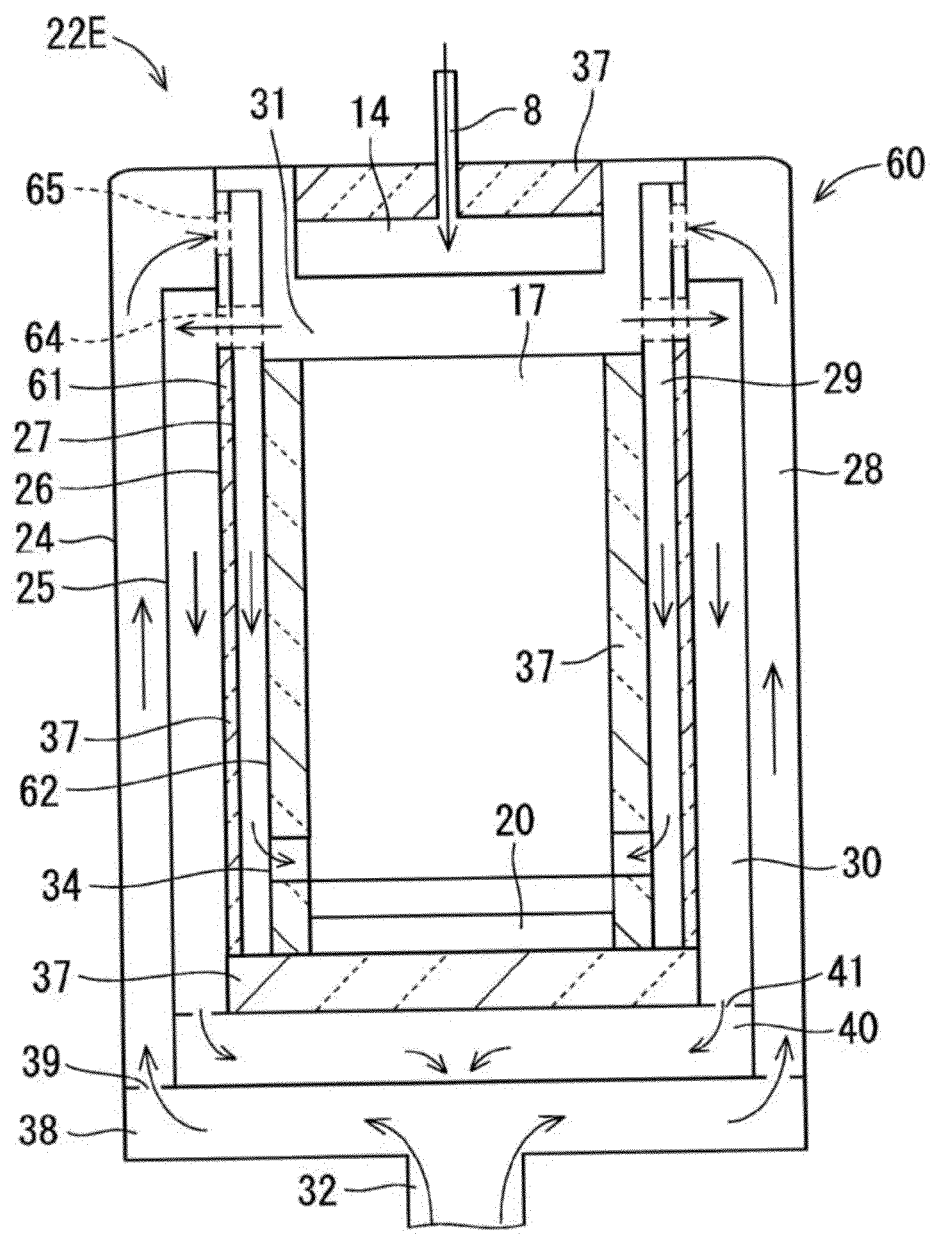
FIG. 16 is a schematic sectional view of an example of a fuel cell module other than that illustrated in FIG. 15.

FIGS. 15 and 16 are schematic sectional views of fuel cell modules 22D and 22E according to an eighth embodiment of the present invention. Each of the fuel cell modules 22D and 22E includes a storage container 60 and the cell stack device 16 accommodated in the storage container 60, and is provided with heat-exchange regulating sections 61, which will be described below.

In the storage container 60, first walls 25 are disposed inside the outer walls 24 with predetermined intervals therebetween, and second walls 26 are disposed inside the first walls 25 with predetermined intervals therebetween. In addition, third walls 27 are disposed inside the second walls 26 with predetermined intervals therebetween, and fourth walls 62 are disposed inside the third walls 27 with predetermined intervals therebetween.

The spaces between the outer walls 24 and the first walls 25 serve as first flow paths 28, the spaces between the third walls 27 and the fourth walls 62 serve as second flow paths 29, and the spaces between the first walls 25 and the second walls 26 serve as third flow paths 30. In addition, the spaces between the second walls 26 and the third walls 27 serve as the heat-exchange regulating sections 61. Thus, the heat-exchange regulating sections 61 are provided between the second flow paths 29 and the third flow paths 30. The air is supplied to the generator chamber 31 at the sides of the storage container 60.

In the storage container 60 illustrated in FIG. 15, the top ends of the first walls 25 are connected to the third walls 27, and the third walls 27 are connected to the top wall (outer wall 24) of the storage container 60. In addition, the top ends of the fourth walls 62 are connected to the third walls 27 at positions above the connecting portions between the first walls 25 and the third walls 27. The top ends of the fourth walls 62 may instead be connected to the top wall (outer wall 24) of the storage container 60. In addition, in this example, the top ends of the second walls 26 are connected to plate members that connect the first walls 25 to the third walls 27. Alternatively, the top ends of the second walls 26 may instead be connected to the third walls 27 at positions below exhaust gas passages 64, which will be described below, for connecting the generator chamber 31 to the third flow paths 30.

An air supply pipe 32 for supplying air to the storage container 60 is connected to a bottom section of the storage container 60. The air supplied through the air supply pipe 32 flows into an air introduction section 38. The air introduction section 38 communicates with the first flow paths 28 through air inlets 39. Therefore, the air that flows through the air introduction section 38 flows into the first flow paths 28 through the air inlets 39. The air flows upward through the first flow paths 28 and flows into the second flow paths 29 through air vents 63 (which correspond to air passages 65 in FIG. 16) formed in the third walls 27. Then, the air flows downward through the second flow paths 29 and is supplied to the generator chamber 31 through the air outlets 34 formed in the fourth walls 62.

Exhaust gas discharged from the fuel cells 17 and exhaust gas generated in the case where the excess fuel gas is burned at the top ends of the fuel cells 17 flow into the third flow paths 30 through the exhaust gas passages 64. The exhaust gas passages 64 are provided between the second walls 26 (the third walls 27 depending on the shape of the second walls 26) and the fourth walls 62 so as to connect the generator chamber 31 to the third flow paths 30. The exhaust gas flows downward through the third flow paths 30 and flows into an exhaust-gas collection section 40 through exhaust-gas collection vents 41. Then, the exhaust gas is discharged to the outside of the storage container 60 through an exhaust-gas discharge pipe (not shown) connected to the exhaust-gas collection section 40.

Therefore, the air supplied through the air supply pipe 32 is subjected to heat exchange with the exhaust gas that flows through the exhaust-gas collection section 40 while the air flows through the air introduction section 38. Then, the air is subjected to heat exchange with the exhaust gas that flows through the third flow paths 30 while the air flows through the first flow paths 28. Then, the air is subjected to heat exchange with the heat in the generator chamber 31 while the air flows through the second flow paths 29.

Therefore, the temperature of the air can be efficiently increased, and the power generation efficiency of the fuel cells 17 can be increased accordingly.

The first flow paths 28, the second flow paths 29, and the third flow paths 30 allow high-efficiency heat exchange between the air and the exhaust gas that flow therethrough. Therefore, the size of the first flow paths 28, the second flow paths 29, and the third flow paths 30 is preferably larger than or equal to the size of the side portions of the cell stack 18 that extend along the direction in which the fuel cells 17 are arranged.

The air supplied through the air supply pipe 32 flows through the first flow paths 28 and the second flow paths 29, and is then supplied to the generator chamber 31. The temperature of the air that flows through the second flow paths 29 is increased by heat exchange with the heat in the generator chamber 31. The exhaust gas that flows into the third flow paths 30 from the generator chamber 31 is subjected to heat exchange with the air at a relatively low temperature that flows through the first flow paths 28. Therefore, there is a possibility that the temperature of the exhaust gas that flows through the third flow paths 30 will be lower than the temperature of the air that flows through the second flow paths 29. As a result, there is a possibility that the temperature of the air that flows through the second flow paths 29 will be reduced by heat exchange between the air that flows through the second flow paths 29 and the exhaust gas that flows through the third flow paths 30. In such a case, the amount of power generation in the fuel cells 17 will be reduced.

Therefore, in the storage container 60 included in the fuel cell module 22E, the heat-exchange regulating sections 61 for reducing the heat exchange between the air that flows through the second flow paths 29 and the exhaust gas that flows through the third flow paths 30 are provided between the second flow paths 29 and the third flow paths 30.

Accordingly, the heat exchange between the air that flows through the second flow paths 29 and the exhaust gas that flows through the third flow paths 30 can be reduced and the possibility that the temperature of the air that flows through the second flow paths 29 will decrease can also be reduced. Therefore, the air at a high temperature can be supplied to the fuel cells 17 and the power generation efficiency of the fuel cells 17 can be increased.

In the example illustrated in FIG. 15, the heat-exchange regulating sections 61 are defined as the spaces between the second walls 26 and the third walls 27 that are connected to each other at positions below the air vents 63 formed in the upper sections of the third walls 27. In the example illustrated in FIG. 16, the heat-exchange regulating sections 61 are defined as the spaces between the second walls 26 and the third walls 27 that are connected to each other at positions above the air passages 65 formed at the upper sections of the second walls 26. Thus, the heat-exchange regulating sections 61 are provided along the third flow paths 30 in the example illustrated in FIG. 15, and are provided along the second flow paths 29 in the example illustrated in FIG. 16.

Since the heat-exchange regulating sections 61 are provided between the second flow paths 29 and the third flow paths 30, the heat exchange between the air that flows through the second flow paths 29 and the exhaust gas that flows through the third flow paths 30 is reduced and air at a high temperature can be supplied to the fuel cells 17.

The heat-exchange regulating sections 61 are preferably provided as spaces that have a low thermal conductivity so that the heat exchange between the air that flows through the second flow paths 29 and the exhaust gas that flows through the third flow paths 30 can be efficiently reduced. Therefore, the heat-exchange regulating sections 61 may be, for example, vacuum spaces. Alternatively, air, heat insulators, concrete, and glass may be disposed in the heat-exchange regulating sections 61. In particular, heat insulators are preferably disposed in the heat-exchange regulating sections 61 in light of the structure and cost of the fuel cell modules 22D and 22E. In such a case, the heat insulators are preferably shaped such that the heat insulators can be easily placed in the heat-exchange regulating sections 61. For example, granular or plate-shaped heat insulators may be used.

To effectively suppress a reduction in the temperature of the air that flows through the second flow paths 29, the size of the second flow paths 29 and the third flow paths 30 is preferably larger than or equal to the size of the side portions of the cell stack 18 that extend along the direction in which the fuel cells 17 are arranged. In addition, the size of the heat-exchange regulating sections 61 provided between the second flow paths 29 and the third flow paths 30 is also preferably larger than or equal to the size of the side portions of the cell stack 18 that extend along the direction in which the fuel cells 17 are arranged.

More specifically, the width of the heat-exchange regulating sections 61 is preferably larger than or equal to the width over which the fuel cells 17 are arranged in the cell stack 18, and the length of the heat-exchange regulating sections 61 is preferably larger than or equal to the length of the fuel cells 17 in the longitudinal direction.

Accordingly, the heat in the generator chamber 31 and the heat generated as a result of power generation performed by the fuel cells 17 are subjected to heat exchange with (conducted into) the air that flows through the second flow paths 29 with high efficiency. In addition, the heat exchange between the air that flows through the second flow paths 29 and the exhaust gas that flows through the third flow paths 30 can be reduced. As a result, the air at a high temperature can be supplied to the fuel cells 17. In addition, since the size of the heat-exchange regulating sections 61 is set to be larger than or equal to the size of the side portions of the cell stack 18 that extend along the direction in which the fuel cells 17 are arranged, the possibility that the temperature in the cell stack 18 will be reduced while the air flows through the second flow paths 29 can also be reduced.

In the examples illustrated in FIGS. 15 and 16, the heat insulators 37 are disposed in the heat-exchange regulating sections 61. In the example illustrated in FIG. 15, the heat insulators 37 disposed in the heat-exchange regulating sections 61 are shaped such that the bottom ends thereof are positioned below the bottom ends of the fuel cells 17 and the top ends thereof are positioned above the top ends of the fuel cells 17. In the example illustrated in FIG. 16, the heat insulators 37 disposed in the heat-exchange regulating sections 61 are shaped such that the top ends thereof are positioned above the top ends of the fuel cells 17. Although not shown in the figures, the width of the heat insulators 37 disposed in the heat-exchange regulating sections 61 is larger than or equal to the width over which the fuel cells 17 are arranged, and the size of the heat insulators 37 is larger than or equal to the size of the side portions of the cell stack 18 that extend along the direction in which the fuel cells 17 are arranged. Accordingly, the heat exchange between the air that flows through the second flow paths 29 and the exhaust gas that flows through the third flow paths 30 can be efficiently reduced and the possibility that the temperature in the cell stack 18 will decrease can also be reduced. As a result, the power generation efficiency of the fuel cells 17 can be increased.

As described above, in the fuel cell modules 22D and 22E, the storage container 60 includes the first flow paths 28 for allowing the air supplied from the air supply pipe 32 to flow upward, the second flow paths 29 for supplying the air that has flowed through the first flow paths 28 to the generator chamber 31 (to the fuel cells 17), the third flow paths 30 for allowing the exhaust gas in the generator chamber 31 to flow downward, and the heat-exchange regulating sections 61 provided between the second flow paths 29 and the third flow paths 30. The structures of the passages may be set appropriately.

(Ninth and Tenth Embodiments)

Figure 17:
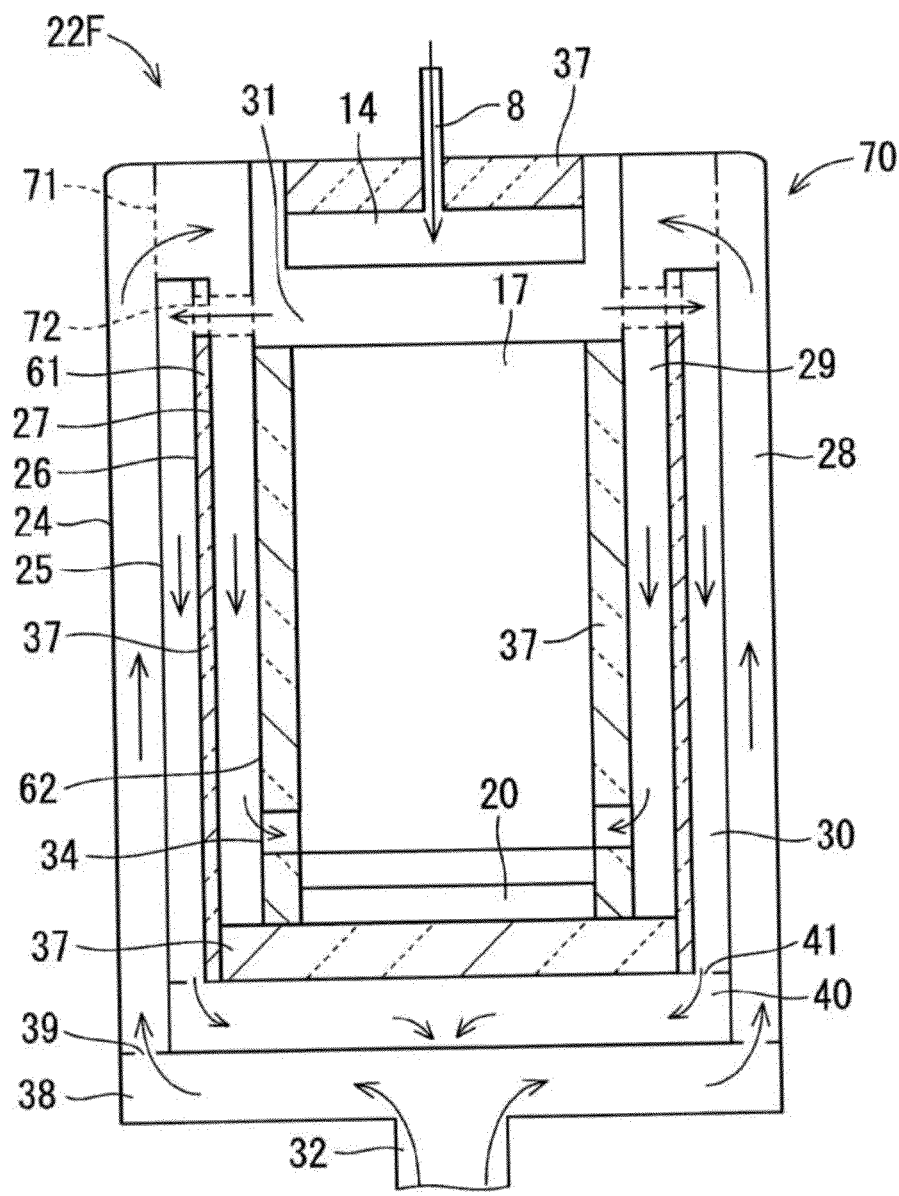
FIG. 17 is a schematic sectional view of a fuel cell module according to a ninth embodiment of the present invention.
Figure 18:
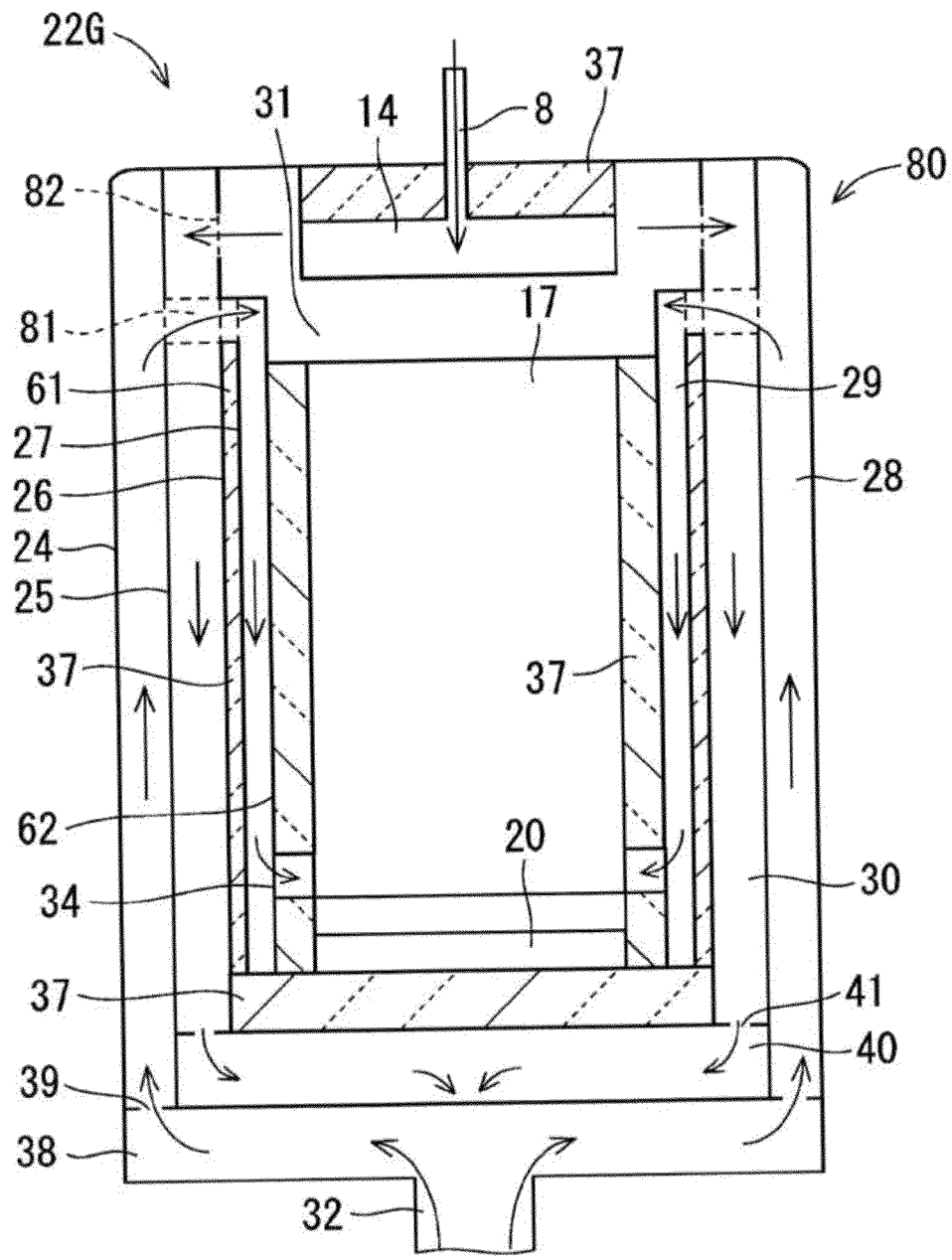
FIG. 18 is a schematic sectional view of a fuel cell module according to a tenth embodiment of the present invention.

FIG. 17 illustrates a fuel cell module 22F according to a ninth embodiment of the present invention. The fuel cell module 22F includes a storage container 70 and the cell stack device 16 accommodated in the storage container 70. FIG. 18 illustrates a fuel cell module 22G according to a tenth embodiment of the present invention. The fuel cell module 22G includes a storage container 80 and the cell stack device 16 accommodated in the storage container 80. In the storage container 70 illustrated in FIG. 17, the top ends of the first walls 25 are connected to the top wall (outer wall 24) of the storage container 70, and air vents 71 through which the first flow paths 28 communicate with the second flow paths 29 are formed in the first walls 25. In addition, the top ends of the second walls 26 and the third walls 27 are positioned below the air vents 71 in the first walls 25. The top ends of the fourth walls 62 are connected to the top wall of the storage container 70, and exhaust gas passages 72 that connect the generator chamber 31 to the third flow paths 30 are provided between the second walls 26 (the third walls 27) and the fourth walls 62. The fourth walls 62 may instead be connected to the first walls 25 at positions closer to the top wall of the storage container 70 than the connecting portions between the first walls 25 and the second walls 26 (the third walls 27) (at positions above the air vents 71). In the storage container 70 illustrated in FIG. 17, the heat-exchange regulating sections 61 are provided along the third flow paths 30.

In the storage container 80 illustrated in FIG. 18, the top ends of the first walls 25 are connected to the top wall (outer wall 24) of the storage container 80, and the top ends of the second walls 26 are also connected to the top wall (outer wall 24) of the storage container 80. Exhaust gas vents 82 through which the generator chamber 31 communicates with the third flow paths 30 are formed between the second walls 26 and the third walls 27. Air passages 81 that connect the first flow paths 28 to the second flow paths 29 are provided between the first walls 25 and the third walls 27 (the second walls 26). The top ends of the fourth walls 62 are connected to the second walls 26 at positions below the exhaust gas vents 82 in the second walls 26 and above or at the same level as the top edges of the air passages 81. The top ends of the second walls 26 may instead be connected to the first walls 25 at positions closer to the top wall of the storage container 80 than the exhaust gas vents 82. In the storage container 80 illustrated in FIG. 18, the heat-exchange regulating sections 61 are provided along the second flow paths 29 as an example.

Also in each of the storage containers 70 and 80 illustrated in FIGS. 17 and 18, respectively, the air supplied through the air supply pipe 32 flows upward through the first flow paths 28, and the air that has flowed through the first flow paths 28 flows into the second flow paths 29. Then, the air flows into the fuel cells 17. In addition, the exhaust gas in the generator chamber 31 flows through the third flow paths 30 and is discharged to the outside of the storage container 70 or the storage container 80. Since the heat-exchange regulating sections 61 are provided between the second flow paths 29 and the third flow paths 30, the heat exchange between the air that flows through the second flow paths 29 and the exhaust gas that flows through the third flow paths 30 can be reduced and the possibility that the temperature of the air that flows through the second flow paths 29 will decrease can also be reduced. Therefore, the air at a high temperature can be supplied to the fuel cells 17, and the power generation efficiency of the fuel cells 17 can be increased.

(Eleventh Embodiment)

Figure 19:
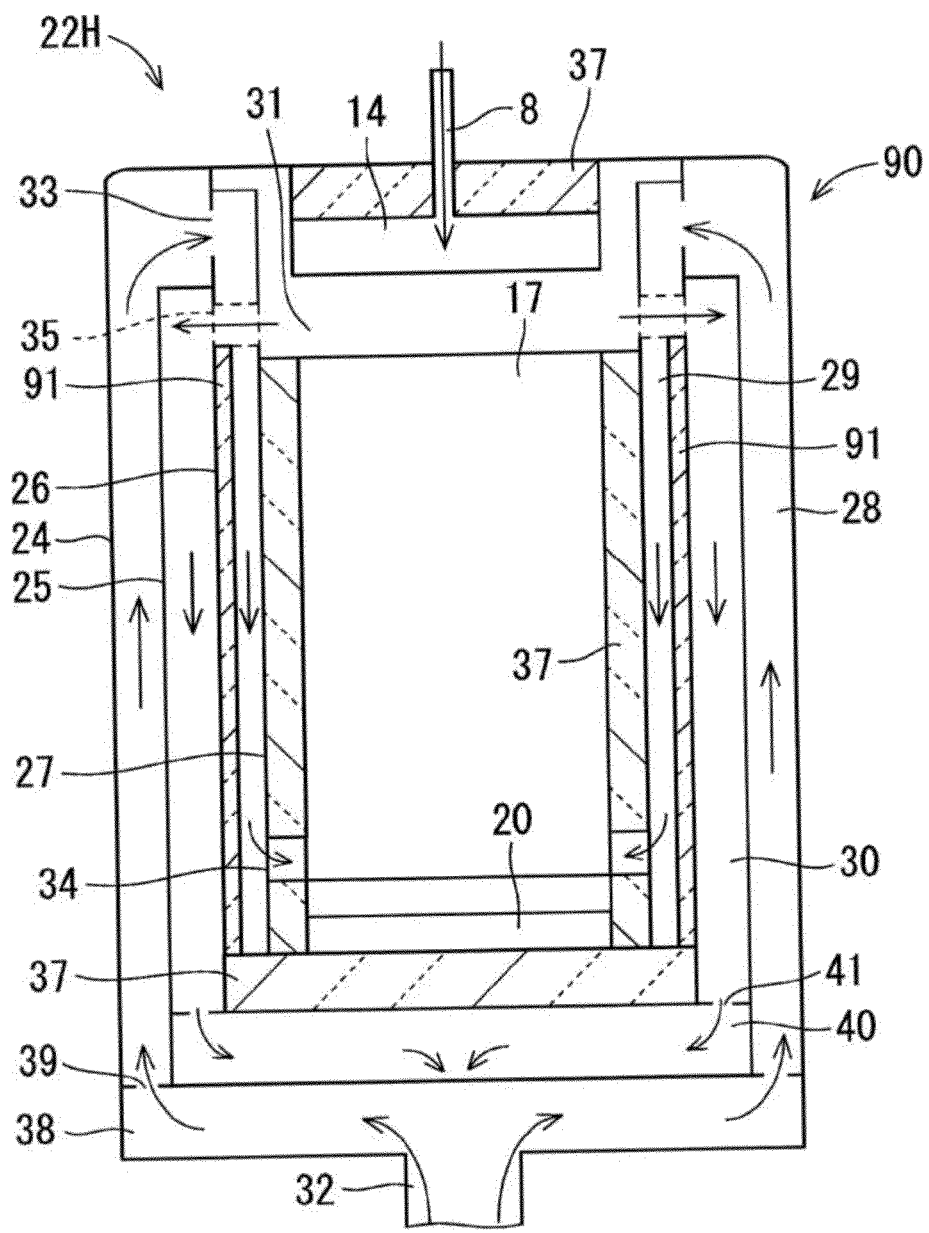
FIG. 19 is a schematic sectional view of a fuel cell module according to an eleventh embodiment of the present invention.
Figure 20:
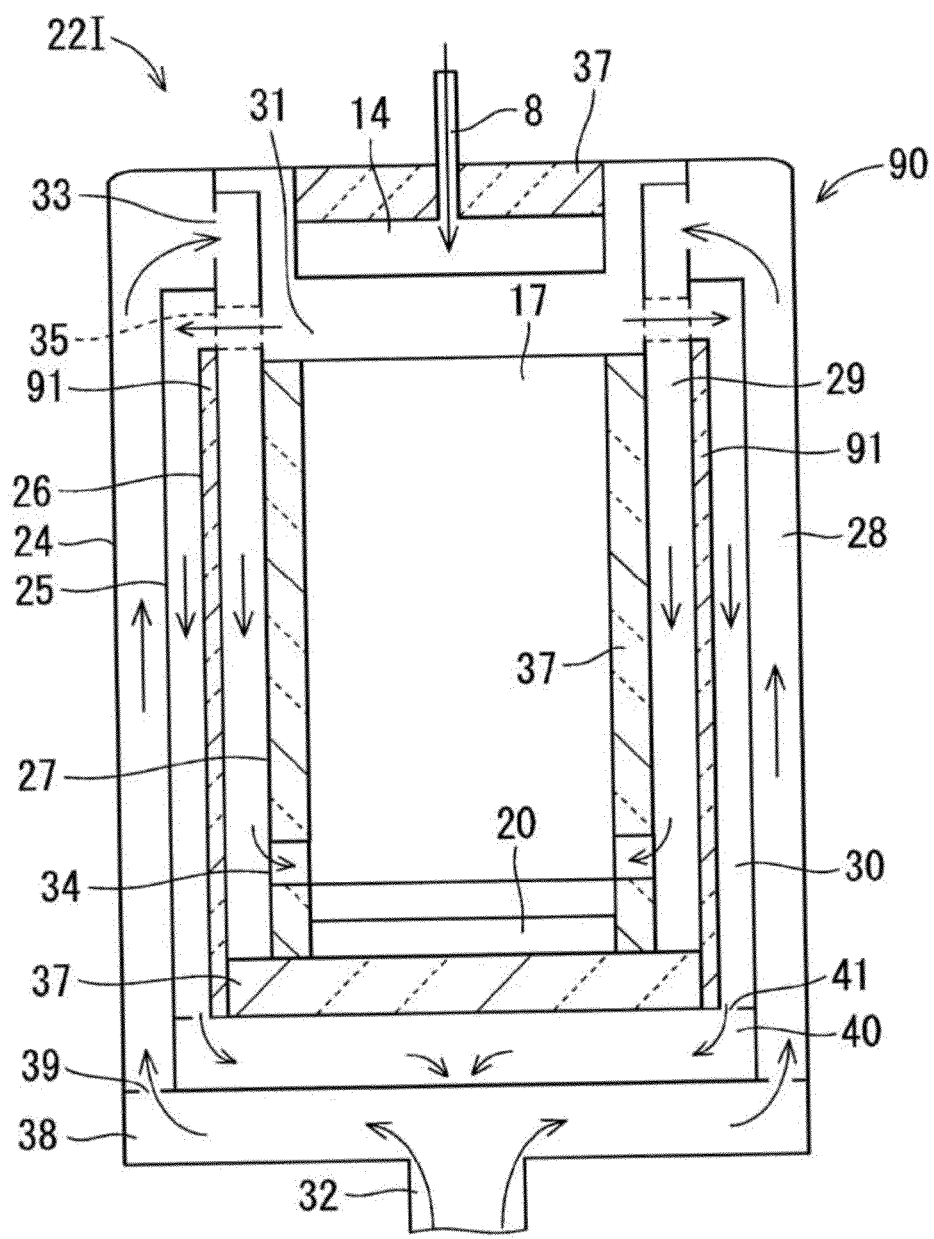
FIG. 20 is a schematic sectional view of an example of a fuel cell module according to the eleventh embodiment of the present invention.

FIGS. 19 and 20 are schematic sectional views of fuel cell modules 22H and 22I according to an eleventh embodiment of the present invention. Each of the fuel cell modules 22H and 22I includes a storage container 90 and the cell stack device 16 accommodated in the storage container 90, and is provided with heat-exchange regulating members 91, which will be described below. The storage container 90 according to the present embodiment is similar to the storage container 23 according to the fifth embodiment. Therefore, parts similar to those of the fifth embodiment are denoted by the same reference numerals, and explanations thereof are omitted.

In the storage container 90, the air supplied through the air supply pipe 32 flows through the first flow paths 28 and the second flow paths 29, and is then supplied to the generator chamber 31. The temperature of the air that flows through the second flow paths 29 is increased by heat exchange with the heat in the generator chamber 31. The exhaust gas that flows into the third flow paths 30 from the generator chamber 31 is subjected to heat exchange with the air at a relatively low temperature that flows through the first flow paths 28. Therefore, there is a possibility that the temperature of the exhaust gas that flows through the third flow paths 30 will be lower than the temperature of the air that flows through the second flow paths 29. As a result, there is a possibility that the temperature of the air that flows through the second flow paths 29 will be reduced by heat exchange between the air that flows through the second flow paths 29 and the exhaust gas that flows through the third flow paths 30. In such a case, the amount of power generation and the power generation efficiency of the fuel cells 17 will be reduced.

Therefore, in the fuel cell modules 22H and 22I according to the present invention, the heat-exchange regulating members 91 for reducing the heat exchange between the air that flows through the second flow paths 29 and the exhaust gas that flows through the third flow paths 30 are provided in at least the second flow paths 29 or the third flow paths 30.

Accordingly, the heat exchange between the air that flows through the second flow paths 29 and the exhaust gas that flows through the third flow paths 30 can be reduced and the possibility that the temperature of the air that flows through the second flow paths 29 will decrease can be reduced. Therefore, the air at a high temperature can be supplied to the fuel cells 17 and the power generation efficiency of the fuel cells 17 can be increased.

FIG. 19 illustrates the example in which the heat-exchange regulating members 91 are provided in the second flow paths 29, and FIG. 20 illustrates the example in which the heat-exchange regulating members 91 are provided in the third flow paths 30. The heat-exchange regulating members 91 may instead be provided in both of the second flow paths 29 and the third flow paths 30. In each of the examples illustrated in FIGS. 19 and 20, the heat-exchange regulating members 91 are fixed to the second walls 26.

The heat of the air that flows through the second flow paths 29 is subjected to heat exchange through the second walls 26 with the exhaust gas that flows through the third flow paths 30. Therefore, since the heat-exchange regulating members 91 are fixed to the second walls 26, the heat exchange between the air that flows through the second flow paths 29 and the exhaust gas that flows through the third flow paths 30 can be efficiently reduced.

The heat-exchange regulating members 91 are not particularly limited as long as the heat exchange between the air that flows through the second flow paths 29 and the exhaust gas that flows through the third flow paths 30 can be reduced, that is, as long as the heat-exchange regulating members 91 have a low thermal conductivity and is not influenced by the temperature of the air that flows through the second flow paths 29. For example, heat insulators, concrete, and glass may be used as the heat-exchange regulating members 91. In light of cost, weight, etc., of the fuel cell modules 22H and 22I, heat insulators are preferably used as the heat-exchange regulating members.

In the case where the heat insulators are used as the heat-exchange regulating members 91, the heat insulators are preferably shaped such that the heat insulators can be easily disposed in at least the second flow paths 29 or the third flow paths 30. For example, plate-shaped heat insulators may be used.

To effectively suppress a reduction in the temperature of the air that flows through the second flow paths 29, the size of the second flow paths 29 and the third flow paths 30 is preferably larger than or equal to the size of the side portions of the cell stack 18 that extend along the direction in which the fuel cells 17 are arranged. In addition, the size of the heat-exchange regulating members 91 is also preferably larger than or equal to the size of the side portions of the cell stack 18 that extend along the direction in which the fuel cells 17 are arranged.

More specifically, in the case where the plate-shaped heat insulators are used as the heat-exchange regulating members 91, the width of the plate-shaped heat insulators is preferably larger than or equal to the width over which the fuel cells 17 are arranged in the cell stack 18, and the length of the plate-shaped heat insulators is preferably larger than or equal to the length of the fuel cells 17 in the longitudinal direction.

Accordingly, the heat in the generator chamber 31 and the heat generated as a result of power generation performed by the fuel cells 17 are subjected to heat exchange with (conducted into) the air that flows through the second flow paths 29 with high efficiency. In addition, the heat exchange between the air that flows through the second flow paths 29 and the exhaust gas that flows through the third flow paths 30 can be reduced. As a result, the air at a high temperature can be supplied to the fuel cells 17. In addition, since the size of the heat-exchange regulating members 91 is set to be larger than or equal to the size of the side portions of the cell stack 18 that extend along the direction in which the fuel cells 17 are arranged, the possibility that the temperature in the cell stack 18 will be reduced while the air flows through the second flow paths 29 can also be reduced.

In the example illustrated in FIG. 19, the heat-exchange regulating members 91 are disposed in the second flow paths 29 such that the top ends of the heat-exchange regulating members 91 are positioned above the top ends of the fuel cells 17. In the example illustrated in FIG. 20, the heat-exchange regulating members 91 are disposed in the third flow paths 30 such that bottom ends of the heat-exchange regulating members 91 are positioned below the bottom ends of the fuel cells 17 and the top ends of the heat-exchange regulating members 91 are positioned above the top ends of the fuel cells 17. Although not shown in the figures, the width of the heat-exchange regulating members 91 is larger than or equal to the width over which the fuel cells 17 are arranged in the cell stack 18, and the size of the heat-exchange regulating members 91 is larger than or equal to the size of the side portions of the cell stack 18 that extend along the direction in which the fuel cells 17 are arranged.

To efficiently suppress a reduction in the temperature of the air that flows through the second flow paths 29, the heat-exchange regulating members 91 are preferably disposed in either the second flow paths 29 or the third flow paths 30 depending on which flow paths have a larger area of the second walls 26 by which the flow paths are defined. In such a case, the heat-exchange regulating members 91 may be fixed to the second walls 26 over the entire area of the second walls 26 that define the flow paths.

Therefore, a reduction in the temperature of the air that flows through the second flow paths 29 can be suppressed, and the air at a high temperature can be supplied to the fuel cells 17. Therefore, the power generation efficiency of the fuel cells 17 can be increased.

To fix the heat-exchange regulating members 91 to the second walls 26, fixing members for fixing the heat-exchange regulating members 91 may be provided on the second walls 26. Alternatively, fixing members for fixing the heat-exchange regulating members 91 to the second walls 26 may be provided on the first walls 25 or the third walls 27.

As described above, in the fuel cell module according to the present invention, the storage container 90 includes the first flow paths 28 for allowing the air supplied from the air supply pipe 32 to flow upward, the second flow paths 29 for supplying the air that has flowed through the first flow paths 28 to the generator chamber 31 (to the fuel cells 17), the third flow paths 30 for allowing the exhaust gas in the generator chamber 31 to flow downward, and the heat-exchange regulating members 91 disposed in at least the second flow paths 29 or the third flow paths 30. The structures of the passages may be set appropriately.

(Twelfth and Thirteenth Embodiments)

Figure 21:
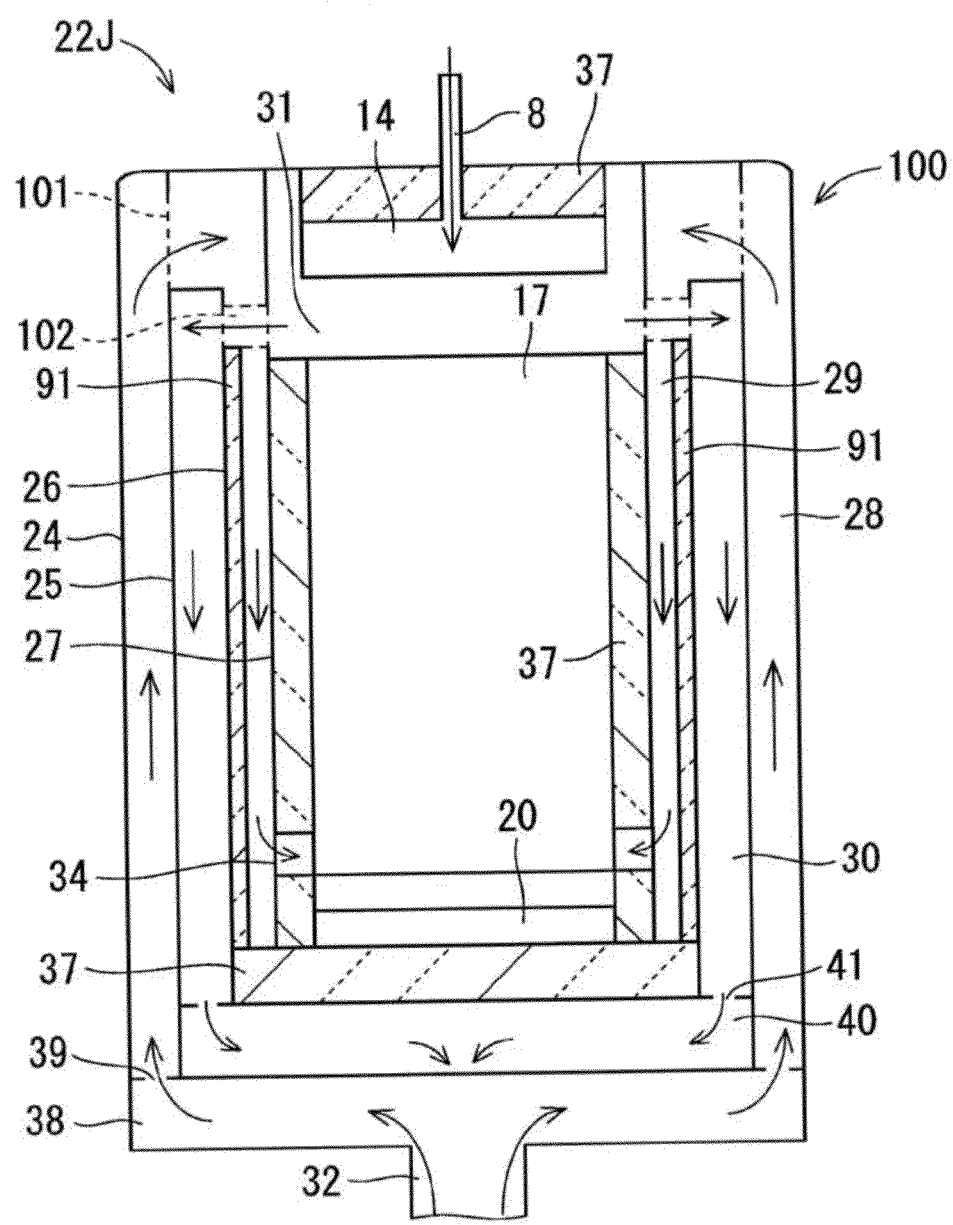
FIG. 21 is a schematic sectional view of a fuel cell module according to a twelfth embodiment of the present invention.
Figure 22:
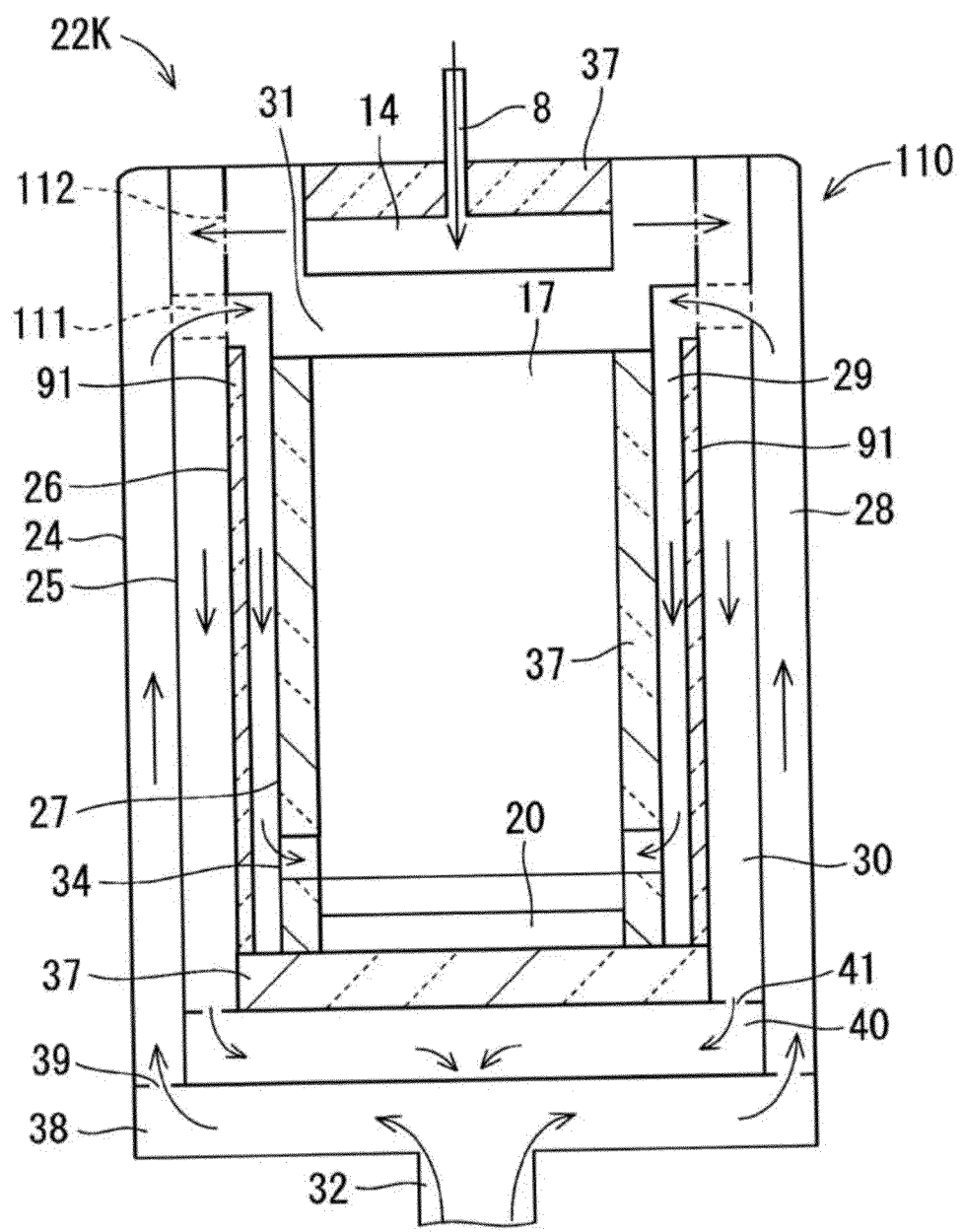
FIG. 22 is a schematic sectional view of a fuel cell module according to a thirteenth embodiment of the present invention.

FIG. 21 illustrates a fuel cell module 22J according to a twelfth embodiment of the present invention. The fuel cell module 22J includes a storage container 100 and the cell stack device 16 accommodated in the storage container 100. FIG. 22 illustrates a fuel cell module 22K according to a thirteenth embodiment of the present invention. The fuel cell module 22K includes a storage container 110 and the cell stack device 16 accommodated in the storage container 110. In the storage container 100 illustrated in FIG. 21, the top ends of the first walls 25 are connected to the top wall (outer wall 24) of the storage container 100, and air vents 101 through which the first flow paths 28 communicate with the second flow paths 29 are formed in the first walls 25. In addition, the top ends of the second walls 26 are positioned below the air vents 101 in the first walls 25. The top ends of the third walls 27 are connected to the top wall of the storage container 100, and exhaust gas passages 102 that connect the generator chamber 31 to the third flow paths 30 are provided between the second walls 26 and the third walls 27. The third walls 27 may instead be connected to the first walls 25 at positions closer to the top wall of the storage container 100 than the connecting portions between the first walls 25 and the second walls 26 (at positions above the air vents 101). In the storage container 100 illustrated in FIG. 21, the heat-exchange regulating members 91 are disposed in the second flow paths 29.

In the storage container 110 illustrated in FIG. 22, the top ends of the first walls 25 are connected to the top wall (outer wall 24) of the storage container 110, and the top ends of the second walls 26 are also connected to the top wall (outer wall 24) of the storage container 110. Exhaust gas vents 112 through which the generator chamber 31 communicates with the third flow paths 30 are formed between the second walls 26 and the third walls 27. Air passages 111 that connect the first flow paths 28 to the second flow paths 29 are provided between the first walls 25 and the second walls 26. The top ends of the third walls 27 are connected to the second walls 26 at positions below the exhaust gas vents 112 in the second walls 26 and above or at the same level as the top edges of the air passages 111. The top ends of the second walls 26 may instead be connected to the first walls 25 at positions closer to the top wall of the storage container 110 than the air passages 111. In the storage container 110 illustrated in FIG. 22, the heat-exchange regulating members 91 are disposed in the second flow paths 29 as an example.

Also in each of the storage containers 100 and 110 illustrated in FIGS. 21 and 22, respectively, the air supplied through the air supply pipe 32 flows upward through the first flow paths 28, and the air that has flowed through the first flow paths 28 flows into the second flow paths 29. Then, the air flows into the fuel cells 17. In addition, the exhaust gas in the generator chamber 31 flows through the third flow paths 30 and is discharged to the outside of the storage container 100 and the storage container 110. Since the heat-exchange regulating members 91 are disposed in the second flow paths 29, the heat exchange between the air that flows through the second flow paths 29 and the exhaust gas that flows through the third flow paths 30 can be reduced and the possibility that the temperature of the air that flows through the second flow paths 29 will decrease can also be reduced. Therefore, the air at a high temperature can be supplied to the fuel cells 17, and the power generation efficiency of the fuel cells 17 can be increased.

(Fourteenth Embodiment)

Figure 23:
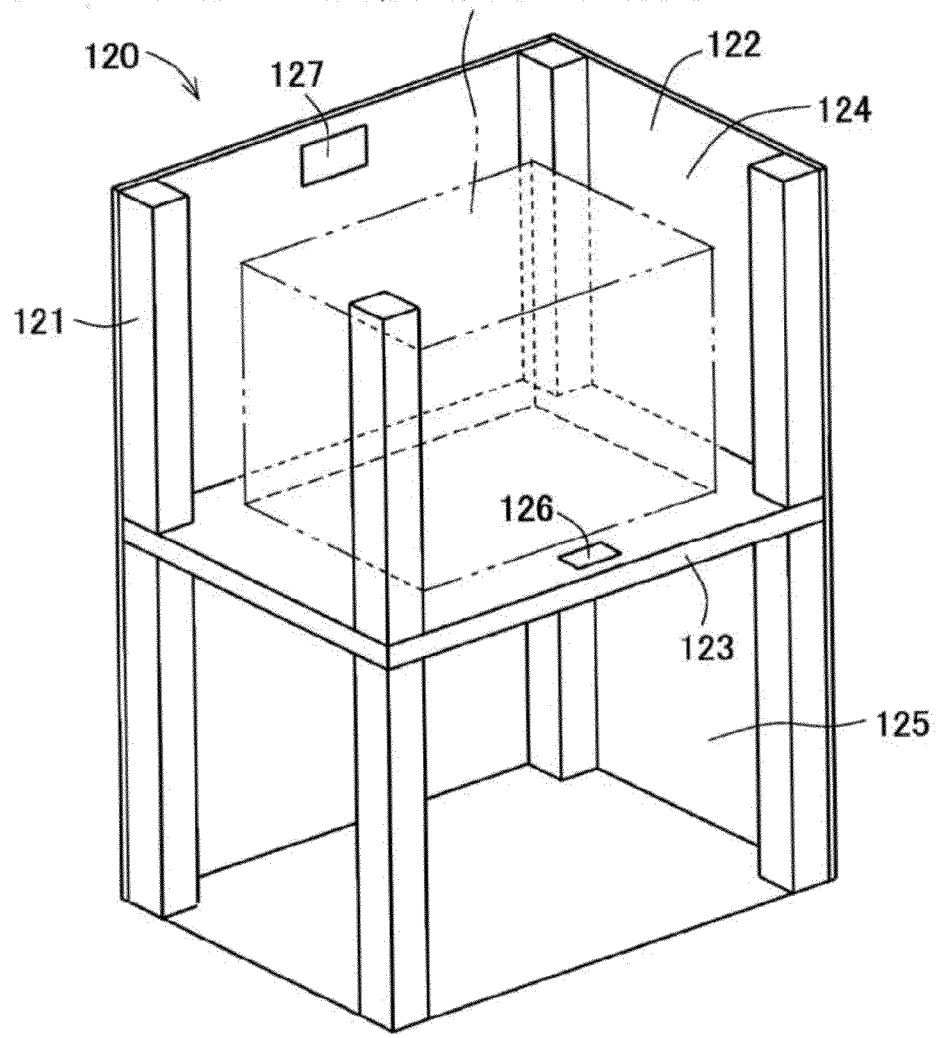
FIG. 23 is a perspective view of a fuel cell device according to a fourteenth embodiment of the present invention.
Figure 24:
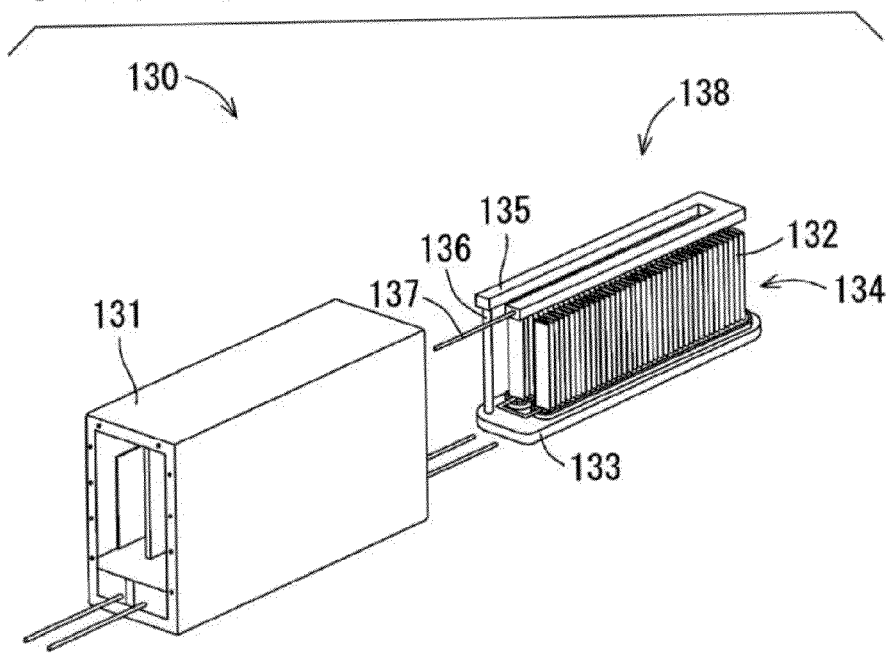
FIG. 24 is a perspective view of a fuel cell module according to a related art.

FIG. 23 is a perspective view of a fuel cell device 120 according to a fourteenth embodiment of the present invention. Parts of the structure are omitted in FIG. 23.

The fuel cell device 120 illustrated in FIG. 23 includes an external casing formed of supports 121 and external plates 122. The inside of the external casing is sectioned into upper and lower sections by a partition plate 123. The upper section serves as a module storage section 124 that accommodates the above-described fuel cell module 22, 22A, 22B, 22C, 22D, 22E, 22F, 22G, 22H, 22I, 22J, or 22K. The lower section serves as an auxiliary-device storage section 125 that accommodates an auxiliary device for driving the fuel cell module 22, 22A, 22B, 22C, 22D, 22E, 22F, 22G, 22H, 22I, 22J, or 22K. The auxiliary device accommodated in the auxiliary-device storage section 125 is omitted in the figure.

An air vent 126 for allowing the air in the auxiliary-device storage section 125 to flow into the module storage section 124 is formed in the partition plate 123. An air outlet 127 for discharging the air in the module storage section 124 is formed in a part of one of the external plates 122 that form the module storage section 124.

In the fuel cell device 120, the fuel cell module 22, 22A, 22B, 22C, 22D, 22E, 22F, 22G, 22H, 22I, 22J, or 22K capable of improving the power generation efficiency as described above is accommodated in the module storage section 124. Therefore, the power generation efficiency of the fuel cell device 120 can be increased.

Although the present invention is described in detail above, the present invention is not limited to the above-described embodiments and various modifications, improvements, etc., are possible within the gist of the present invention.

For example, with regard to the cell stack device 16 accommodated in the storage container 23, 47, 50, 60, 70, 80, 90, 100, or 110, examples are described above in which a single cell stack 18, in each of which a plurality of fuel cells 17 are arranged, is arranged on the manifold 20. However, the cell stack device 16 may be structured such that two cell stacks 18 are arranged on the manifold 20. In such a case, the air is supplied to the fuel cells 17 through the air outlets 34 at the sides of the cell stacks 18.

In addition, the storage container 23, 47, 50, 60, 70, 80, 90, 100, or 110 is not particularly limited as long as the first flow paths 28, the second flow paths 29, and the third flow paths 30 are formed between the outer walls 24 and the first walls 25, between the second walls 26 and the third walls 27, and between the first walls 25 and the second walls 26, respectively, and the positions of the air vents and the exhaust gas vents may be changed.

The present invention can be incorporated in various other embodiments without departing from the spirit or main features of the present invention. Therefore, the above-described embodiments are merely examples in every respect. The scope of the present invention is defined by the appended claims and is not limited by the description. Modifications and alterations within the scope defined by the appended claims are all included in the scope of the present invention.

The invention claimed is:

1. A cell stack device comprising:
    a cell stack including a plurality of column-shaped fuel cells arranged in an upright position and electrically connected to each other, the fuel cells including gas passages provided therein, the cell stack including a central section of fuel cells;
    a manifold to which bottom ends of the fuel cells are fixed and which is configured to supply fuel gas to the fuel cells;
    a reformer disposed above the cell stack, the reformer comprising
        a tubular container that extends in a longitudinal direction and comprises two ends and a central section in the longitudinal direction between the two ends;
        a vaporization part provided with a supply port through which raw fuel is supplied, the vaporization part being provided at the central section of the tubular container; and
        reforming parts separated from each other, each reforming part provided at each end of the two ends, each reforming part containing reforming catalyst that reforms the raw fuel that flows into the reforming part from the vaporization part into fuel gas, each reforming part provided with a fuel-gas supply port through which the fuel gas is discharged,
        wherein the supply port is located at the central section of the tubular container; and
    fuel-gas supply pipes provided at both ends of the manifold, the fuel-gas supply pipes being connected to the respective fuel-gas supply ports,
    wherein the fuel cells are arranged in the longitudinal direction and the vaporization part of the reformer positioned above the central section of fuel cells of the cell stack.

2. The cell stack device according to claim 1, wherein distances from the supply port in the vaporization part to connecting portions at which the fuel-gas supply pipes are connected to the manifold are equal to each other.

3. A fuel cell module comprising:
    a storage container; and
    the cell stack device according to claim 1, the cell stack device being accommodated in the storage container,
    wherein the reformer is provided on an inner surface of a top wall of the storage container.

4. A fuel cell device comprising:
    an external casing;
    the fuel module according to claim 3, the fuel cell module being accommodated in the external casing; and
    an auxiliary device for driving the fuel cell module.

5. A cell stack device comprising:
    a cell stack including a plurality of column-shaped fuel cells arranged in an upright position and electrically connected to each other, the fuel cells including gas passages provided therein, the cell stack including a central section of fuel cells;
    a manifold to which bottom ends of the fuel cells are fixed and which is configured to supply fuel gas to the fuel cells;
    a reformer disposed above the cell stack, the reformer comprising
        a tubular container that extends in a longitudinal direction and comprises two ends and a central section in the longitudinal direction between the two ends;
        a vaporization part provided with a supply port through which raw fuel is supplied, the vaporization part being provided at the central section of the tubular container;
        walls comprising gas permeability;
        reforming parts separated from each other and the vaporization part by the walls comprising gas permeability, each reforming part provided at each end of the two ends, each reforming part containing reforming catalyst that reforms the raw fuel that flows into the reforming part from the vaporization part into fuel gas, each reforming part provided with a fuel-gas supply port through which the fuel gas is discharged, wherein the supply port is located at the central section of the tubular container; and fuel-gas supply pipes provided at both ends of the manifold, the fuel-gas supply pipes being connected to the respective fuel-gas supply ports, wherein the fuel cells are arranged in the longitudinal direction and the vaporization part of the reformer is positioned above the central section of fuel cells of the cell stack.

6. A cell stack device comprising:

a cell stack including a plurality of column-shaped fuel cells arranged in an upright position and electrically connected to each other, the fuel cells including gas passages provided therein, the cell stack including a central section of fuel cells;

a manifold to which bottom ends of the fuel cells are fixed and which is configured to supply fuel gas to the fuel cells;

a reformer disposed above the cell stack, the reformer comprising a tubular container that extends in a longitudinal direction and comprises two ends and a central section in the longitudinal direction between the two ends;

a vaporization part provided with a supply port through which raw fuel is supplied, the vaporization part being provided at the central section of the tubular container;

reforming parts separated from each other, each reforming part provided at each end of the two ends, each reforming part containing reforming catalyst that reforms the raw fuel that flows into the reforming part from the vaporization part into fuel gas, each reforming part provided with a fuel-gas supply port through which the fuel gas is discharged, wherein the supply port is located at the central section of the tubular container; and fuel-gas supply pipes provided at both ends of the manifold, the fuel-gas supply pipes being connected to the respective fuel-gas supply ports, wherein the fuel cells are arranged in the longitudinal direction, the fuel gas is supplied from the respective fuel gas supply ports through the respective fuel-gas supply pipes to the manifold at the both ends thereof at the same time, and the vaporization part of the reformer is positioned above the central section of fuel cells of the cell stack.

* * * * *